TRAFFIC SIGNAL CYCLE SPLIT CONTROL SYSTEM

Filed Dec. 20, 1963 9 Sheets-Sheet 1

INVENTORS
J. H. AUER JR. AND
K. H. FRIELINGHAUS
BY Forest B. Hitchcock
THEIR ATTORNEY INVENTORS
J. H. AUER JR AND
K. H. FRIELINGHAUS
BY
Forest B. Hitchcock
THEIR ATTORNEY

TRAFFIC SIGNAL CYCLE SPLIT CONTROL SYSTEM

Filed Dec. 20, 1963 9 Sheets-Sheet 3

INVENTORS
J.H. AUER JR. AND
K.H. FRIELINGHAUS

BY Forest B. Hitchcock

THEIR ATTORNEY

INVENTORS
J. H. AUER JR. AND
K. H. FRIELINGHAUS
BY Forest B. Hitchcock
THEIR ATTORNEY

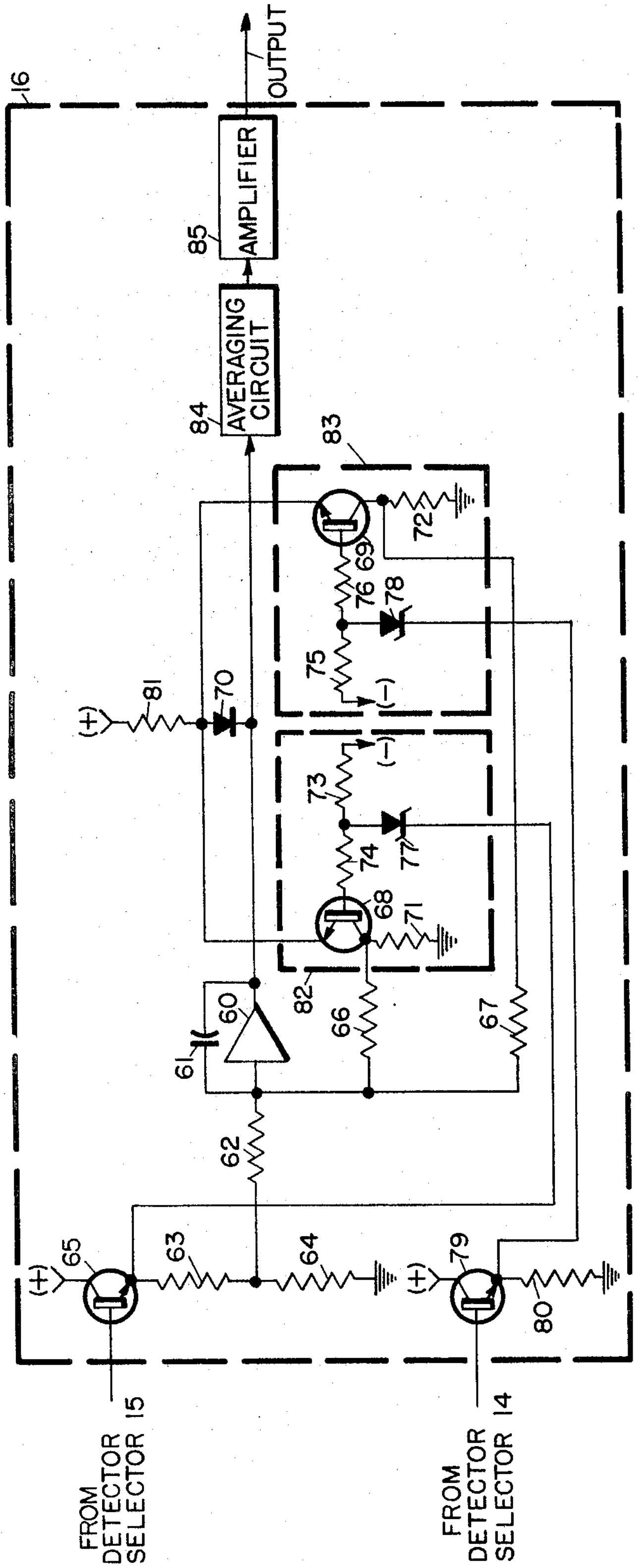
FIG. 4
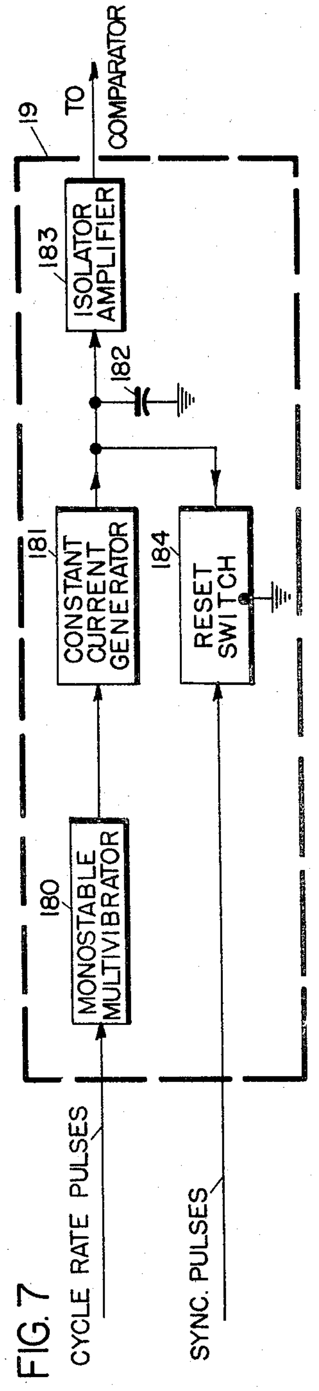
INVENTORS
J. H. AUER JR. AND
K. H. FRIELINGHAUS
BY Forest B. Hitchcock
THEIR ATTORNEY INVENTORS
J.H.AUER JR. AND
K.H.FRIELINGHAUS
BY
Forest B. Hitchcock
THEIR ATTORNEY Feb. 21, 1967 J. H. AUER, JR., ETAL 3,305,827

TRAFFIC SIGNAL CYCLE SPLIT CONTROL SYSTEM

Filed Dec. 20, 1963 9 Sheets-Sheet 7

INVENTORS
J. H. AUER JR. AND
K. H. FRIELINGHAUS
BY Forest B. Hitchcock
THEIR ATTORNEY INVENTORS
J.H. AUER JR. AND
K.H. FRIELINGHAUS
BY
Forest B. Hitchcock
THEIR ATTORNEY INVENTORS
J.H. AUER JR. AND
K.H. FRIELINGHAUS
BY
Forest B. Hitchcock
THEIR ATTORNEY United States Patent Office 3,305,827

Patented Feb. 21, 1967

3,305,827

TRAFFIC SIGNAL CYCLE SPLIT CONTROL SYSTEM

John H. Auer, Jr., Fairport, and Klaus H. Frielinghaus, Rochester, N.Y., assignors to The General Signal Corporation, Rochester, N.Y., a corporation of New York Filed Dec. 20, 1963, Ser. No. 332,077
9 Claims. (Cl. 340—36)

This invention relates to a system for controlling traffic signal cycle split, and more particularly to a system which selects optimum split for an arterial traffic control system as a function of traffic distribution measured on the artery and intersecting streets at any number of intersections along the artery.

Cycle split, at any intersection, may be defined as the ratio of traffic signal green time allocated to any one street at the intersection, to the total length of time allocated to a single traffic signal cycle. In the instant invention, one or more key intersections may be chosen for use as split sampling locations. At each such selected intersection, vehicle detectors are situated for monitoring traffic on all approaches. From information supplied by these detectors, a measurement of relative traffic distribution between the artery and cross streets is obtained at each sampling location. This information is then transmitted from each sampling location to a master split computer common to the selected intersections. At the master split computer, split information from the various sampling intersections is combined, and a split selection for the entire system is performed. The selected split is then transmitted to all intersections within the system for use in the make-up of each local traffic signal cycle. In this fashion, cycle split for traffic signals along the artery is selected in response to sensed traffic conditions.

The system may compute split based on density, volume, or lane occupancy information, as a matter of preference. In the preferred embodiment herein described, lane occupancy information is utilized, since it has been determined, through traffic studies, that cycle split selected on the basis of lane occupancy information represents a reasonable value for use at the arterial intersections. The system is intended for use with traffic control apparatus providing cycle duration information in the form of repetitive pulses, such as that described in J. H. Auer, Jr. application Serial No. 306,036, filed September 3, 1963. In addition, the system may be made responsive to arterial traffic signal offset information, such as that provided from the offset computer described in J. H. Auer, Jr. et al. application Serial No. 305,967, filed September 3, 1963. Since both aforementioned applications are concerned with sensed traffic parameters, and provide output information accordingly, and since the instant invention is likewise concerned with sensed traffic parameters, and provides output information accordingly, use of the instant invention in combination with apparatus such as that described in the aforementioned applications permits operation of a major integrated traffic control system in response to traffic conditions with automatic adjustment of traffic signals for the most efficient movement of traffic through the intersections along the controlled artery.

One object of the invention is to provide a versatile cycle split selection system for arterial traffic control.

Another object is to provide a computer for calculating traffic signal cycle split at intersections along an artery based upon traffic conditions sampled at preselected arterial intersections.

Another object is to provide a computer for calculating cycle split, based upon traffic conditions at predetermined sampling intersections, which is independent of traffic information otherwise provided by split transponders which have failed at any of the sampling intersections.

Another object is to provide a cycle split selection system wherein analog voltages representing traffic conditions at intersections along an artery are transmitting in digital form to a central computer which provides a single analog split voltage for traffic signals at intersections along the artery.

Another object is to provide an isolation amplifier employing a field-effect transistor in order to supply a high input impedance and low output impedance characteristic.

The invention contemplates a cycle split selection system for traffic signals dispersed along an artery having a plurality of cross street intersections, comprising vehicle detectors situated at any number of the intersections for monitoring traffic conditions on each approach to those intersections. At each monitored intersection, output voltages supplied from the vehicle detectors are coupled to a traffic distribution analog computer which provides an output parameter representing the ratio of traffic congestion on the cross street to total traffic congestion on the cross street plus the artery, as sensed at the monitored intersection. Also provided for each monitored intersection is a staircase counter for supplying an output voltage which increases in amplitude with each received cycle pulse from a remote master cycle duration generator. The staircase counter is reset each time a predetermined number of cycle pulses have been received, thereby demarcating the end of one cycle and the beginning of the next. Comparator means are provided for comparing output voltage amplitudes of both the traffic distribution analog computer and the staircase counter, so that whenever the amplitude of one voltage becomes greater or less than the amplitude of the other, a change in comparator output voltage is produced. Hence, the ratio of time elapsed from the instant at which the staircase counter is reset to the instant at which the counter output voltage amplitude rises above the output voltage amplitude of the traffic distribution analog computer, to time elapsed between the instants at which the staircase counter is reset, represents optimum split for the monitored intersection. This ratio is represented by a pulse-length modulated voltage supplied from the comparator to one input of a master split computer. The master split computer additionally is responsive to comparator output voltages at each of the remaining monitored intersections, and selects a split voltage for all the traffic signal local controllers along the artery. The master split computer is inherently nonresponsive to loss of voltage supplied from a monitored intersection, thus enabling the split voltage supplied by the computer to represent a correct value of optimum arterial cycle split.

The master split computer provides output information in the form of an analog potential representing the ratio of total traffic congestion on the cross streets at each monitored intersection, to the sum of total traffic congestion on the artery at each monitored intersection plus total traffic congestion on the cross streets at each monitored intersection. The amplitude of this analog potential thus represents optimum split for all the arterial traffic signal local controllers. Use of the master split computer permits an analog parameter to be transmitted over a line by digital techniques, so that information accuracy is maintained without regard to variations in line resistance, line leakage, etc.

The master split computer comprises an operational amplifier having a feedback capacitor shunted across the input and output terminals. A plurality of input resistors are each coupled to the input terminal of the operational amplifier. Input energy supplied to the split computer from each comparator is applied to separate switching means at the split computer. Each of the latter means couples a capacitor to one of the input resistors during receipt of a signal from the comparator, and couples the capacitor to the output terminal of the operational amplifier during receipt of no signal from the comparator. A second capacitor is also coupled to each of the aforementioned switching means. Additional switching means responsive to received cycle pulses are coupled between an additional input resistor and each of the separate switching means connected in parallel. Hence, during each signal cycle, each second capacitor is coupled to the additional switching means for a portion of the cycle depending upon the amplitude of the respective split input signal supplied to the separate switching means. Thus, each split input signal is coupled to the additional input resistor during the total portion of the time in which cycle rate pulses are received. Output voltage amplitude supplied from the operational amplifier represents the optimum system split signal, and may be classified according to amplitude, in order to select a split voltage.

The foregoing and other objects and advantages of the invention will become apparent from the following detailed description when read in connection with the accompanying drawings, in which:

FIG. 4 is a part schematic and part block diagram of the traffic distribution computer shown in block form in FIG. 1, for operation in association with a two-phase intersection.

FIG. 7 is a part schematic and part block diagram of the staircase counter shown in block form in FIG. 1.

Figures 1, 14:
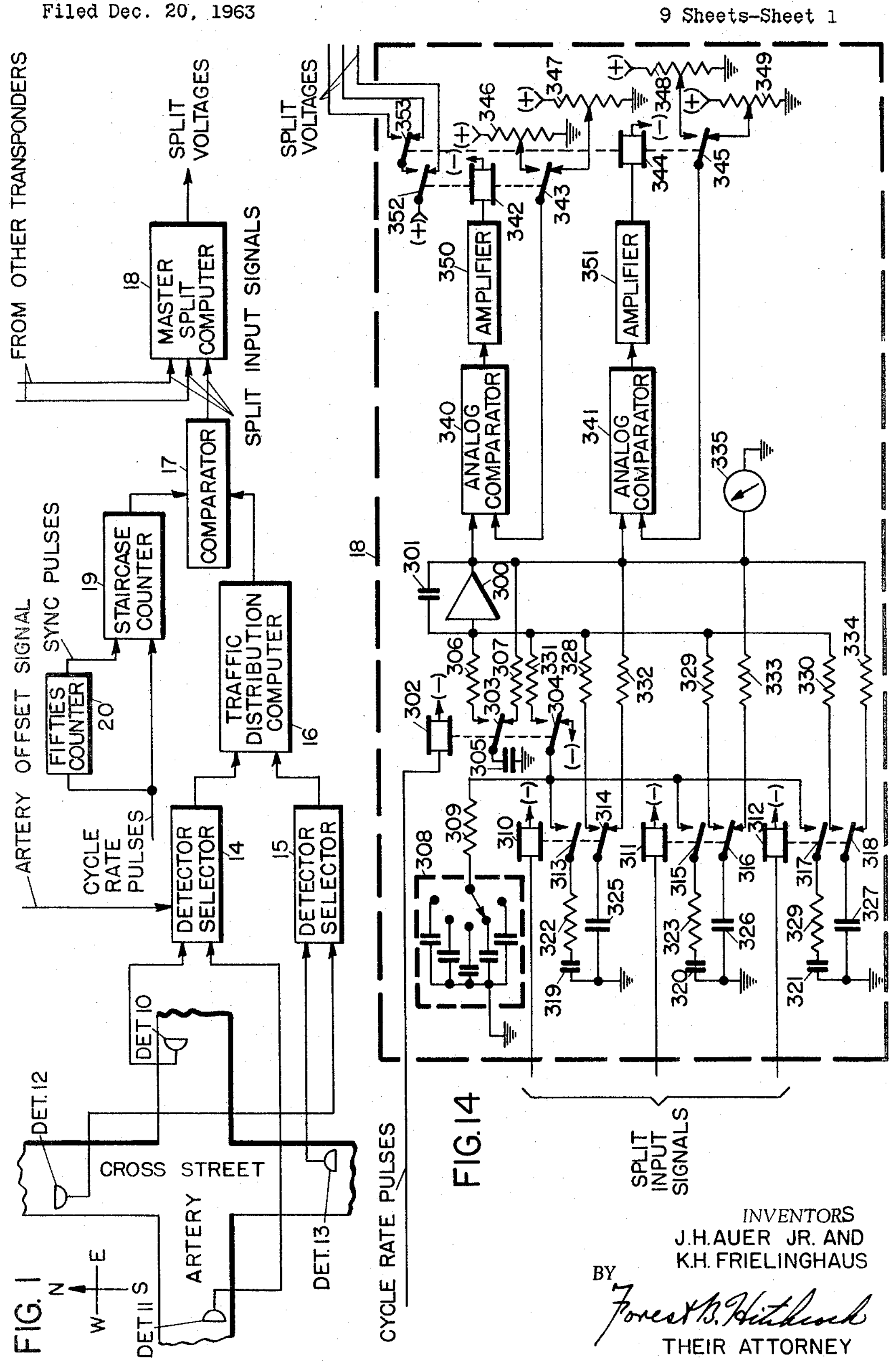
FIG. 1 is a block diagram of a typical split transponder located at each monitored intersection along a traffic artery.
FIG. 14 is a part schematic and part block diagram of the master split computer, shown in block form in FIG. 1.
Figures 2, 5:
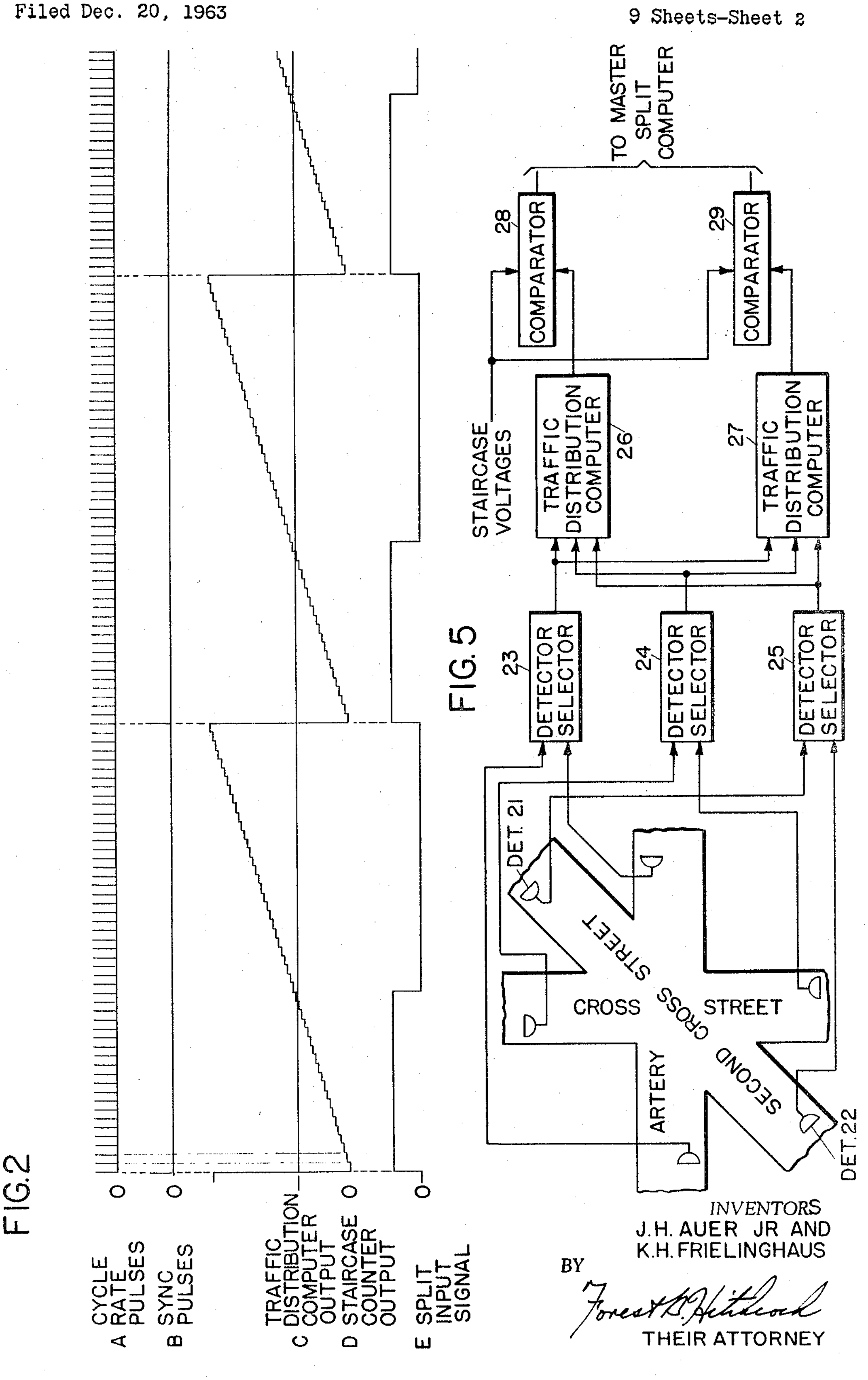
FIG. 2 is a family of curves to aid in explaining operation of the system of FIG. 1.
FIG. 5 is a portion of the apparatus comprising a typical split transponder at a monitored three-phase intersection along a traffic artery.

*General system description—FIGURES 1 and 2*

Turning now to FIG. 1, there is shown a block diagram of a split transponder situated at a two-phase monitored intersection along an artery having traffic signals situated at various specified locations. At each monitored intersection, a split transponder, such as that shown in FIG. 1, supplies a split input signal to a master split computer 18 for the artery. The master split computer then supplies split control voltages to the traffic signals along the artery, in accordance with sensed traffic conditions.

More specifically, FIG. 1 diagrammatically illustrates the intersection of a north-south cross street with an east-west artery. A pair of vehicle detectors is situated on both the artery and cross street for the purpose of monitoring all traffic passing through the intersection. Although, for simplicity, a single detector is shown sensing traffic flow in any single direction, obviously, for multi-lane streets and arteries, a plurality of detectors could be utilized, each sensing traffic conditions on a separate lane.

Outputs from detectors 10 and 11, sensing westbound and eastbound arterial traffic, respectively, are coupled to a detector selector circuit 14, while outputs from cross street southbound detector 12 and northbound detector 13 are coupled to a detector selector circuit 15. The detector selectors are used to select output energy from only the detectors sensing traffic flow in the direction of heaviest traffic, to be used in making split computations. Referring to the two-phase intersection of FIG. 1, it arterial traffic is heaviest in the westbound direction, detector selector 14 provides a noutput signal representing the output of detector 10, while completely ignoring vehicle detections by detector 11. Conversely, if traffic flow along the artery is heaviest in the eastbound direction, detector 11 is selected by detector selector 14, and detector 10 is completely ignored. Detector selector 15 functions in a manner similar to that of detector selector 14, but is responsive to either detector 12 or 13, depending upon which of the two is sensing heavier traffic flow.

Detector selector 14, which is responsive to arterial traffic flow, may alternatively be controlled by an offset signal provided from apparatus such as the offset computer described in the aforementioned application Serial No. 305,967. Thus, under preferential offset conditions, detector selector 14 may be made to select the detector sensing traffic flow in the direction of the preferential offset. However, if a balance of traffic occurs, so that an average or a non-preferential arterial offset is in effect, then the detector selector may preferably be permitted to make a selection based upon relative measurements of traffic flow as sensed by detectors 10 and 11.

Outputs from detector selectors 14 and 15 are coupled to a traffic distribution computer 16, which is preferably of the analog type. This computer provides a parameter which may be represented as $$\frac{C}{C+A}$$

where C represents a measure of traffic congestion on the cross street and A represents a measure of traffic congestion on the artery. It will be recognized that this parameter represents, in effect, relative distribution of traffic between the cross street and the artery, and when expressed as a percentage, represents optimum cross street split at the monitored intersection. This parameter assumes a value of zero when the cross street carries no traffic, and assumes a value of 100% when the artery carries no traffic. When both the artery and cross street carry traffic, the parameter assumes an intermediate value which represents the ratio of traffic flow on the cross street to total traffic flow through the intersection. Computer 16 may compute the ratio of cross street traffic density to the sum of artery and cross street traffic densities, the ratio of cross street traffic volume to the sum of artery and cross street volumes, or the ratio of cross street lane occupancy to the sum of artery and cross street lane occupancies. In the preferred embodiment, the ratio of lane occupancies is computed. Output voltage of computer 16 thus represents a reasonable determination of split for use at the monitored intersection. This voltage is illustrated by waveform C of FIG. 2.

Output voltage from computer 16 is supplied to one input of a comparator 17. The second input to the comparator is supplied from a staircase counter 19. Comparator 17 produces an output voltage of a first predetermined amplitude when the output voltage amplitude of computer 16 exceeds the output voltage amplitude of staircase counter 19, and produces an output voltage of a second predetermined amplitude when the output voltage of staircase counter 19 exceeds the output voltage of computer 16. The comparator output voltages are supplied to a master split computer 18, which is responsive to the split transponders located at each monitored intersection. The master split computer then provides split voltages to the arterial traffic signal local controllers, based upon split input signals received from the monitored intersections. Those skilled in the art will recognize that the comparator may be considered a multiplier, since the product of the staircase counter output voltage and computer 16 output voltage is represented by variable duration output pulses. This variable duration is proportional to the aforementioned product.

It should be noted that output voltage amplitude provided from staircase counter 19 is dependent upon signal cycle duration. This is because the counter counts input pulses, the repetition rate of which is solely dependent upon cycle duration. Each cycle is represented by a predetermined number of pulses; for example, 50, as illustrated by waveform A of FIG. 2. Hence, during each cycle, output voltage from counter 19 increases stepwise in amplitude from zero, which exists immediately prior to occurrence of the first pulse in each cycle, to a maximum amplitude, upon occurrence of the final pulse in each cycle; here, the fiftieth pulse. Each received cycle rate pulse increases the output voltage amplitude of counter 19 by a fixed increment. The counter then maintains this output voltage at a constant level until receipt of the next cycle pulse which increases output voltage amplitude of counter 18 by another fixed increment. Each increment is of identical amplitude. Upon occurrence of the final pulse in each cycle (this being the fiftieth pulse in the instant case), counter 19 is reset by a sync pulse, causing its output voltage amplitude to fall, substantially instantaneously, to zero. The sync pulses are illustrated by waveform B of FIG. 2, while the staircase counter output voltage is illustrated by waveform D of FIG. 2.

Cycle rate pulses applied to the staircase counter may be generated by a traffic signal controller cycle computer such as that described in aforementioned application Ser. No. 306,036. The number of pulses supplied during each cycle is dependent upon the degree of system resolution required. Although 100 pulses per cycle provides a high order of resolution, it has been determined that resolution attainable thereby is finer than that necessary to provide a system of high accuracy; hence, the system utilizes fifty pulses per cycle. This provides 2% resolution instead of the 1% attainable when 100 pulses per cycle are provided. It has been determined that 2% system of resolution is sufficient for excellent control of traffic signals. Hence, a counter 20 is coupled to the cycle rate pulse lead, for the purpose of providing a single output pulse each time a train of 50 pulses has been counted. This counter may comprise one of the well known ring counters, which simultaneously provides a single output pulse after having counted a predetermined number of input pulses, and resets to zero. This counter, which is preferably situated at the cycle computer location, thus supplies the aforementioned sync pulse which resets the staircase counter.

To briefly recapitulate operation of the split transponder of FIG. 1, a selection of the detector on the cross street sensing heaviest traffic flow, and a selection of a detector along the artery either in response to an artery offset signal or in response to direction of heaviest traffic flow along the artery, is made by detector selectors 15 and 14, respectively. Output voltage from each selected detector is supplied to traffic distribution computer 16, which computes a traffic parameter based upon the ratio of traffic conditions on the cross street to traffic conditions on the cross street plus the artery, and supplies an output voltage representative of this parameter to one input of comparator 17. Output voltage from staircase counter 19, which in turn is responsive to the pulse repetition rate of received cycle rate pulses, is applied to the second input of comparator 17. A comparison of relative amplitudes of output voltages produced by computer 16 and counter 19 is performed in comparator 17. Whenever output voltage amplitude of computer 16 exceeds output voltage amplitude of counter 19, comparator 17 provides a positive output voltage. However, when output voltage amplitude of staircase counter 18 exceeds output voltage amplitude of traffic distribution computer 16, comparator 17 output voltage falls to zero. The output voltage produced by comparator 17 and illustrated by waveform E of FIG. 2, constitutes a split input signal to master split computer 18, which is similarly responsive to output voltages from other arterial split transponders. The master split computer then provides an output split voltage for controlling split of the arterial traffic signals. It will be recognized that since each split input signal supplied to computer 18 constitutes an optimum digital split signal at the monitored intersection, the split transponder can be utilized to provide a local optimum split signal for control of the local traffic signal controller at the monitored intersection in either digital form from comparator 17 or analog form from computer 16. In this event, positive output voltage produced by the comparator, or multiplier, during each signal cycle, represents cross street green time at the monitored intersection, while the remainder of the cycle, during which zero output voltage is produced by the comparator, represents artery green time at the monitored intersection. Where the analog form is utilized, it is also possible to classify the analog voltage into one of several voltages selected according to amplitude by means of a level classifier, prior to application of the optimum split voltage to the local controller.

Figures 3, 10:
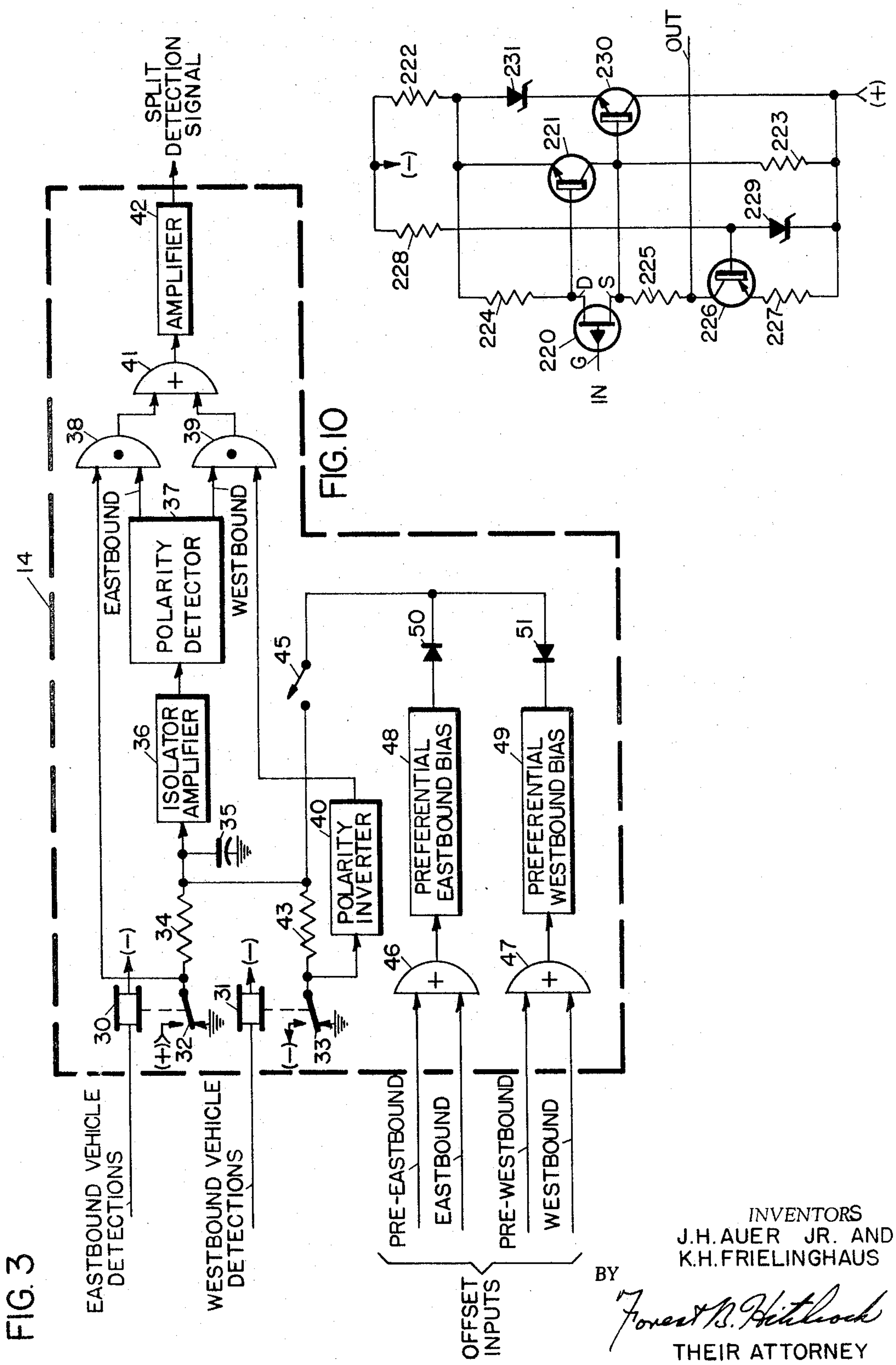
FIG. 3 is a part schematic and part block diagram of a typical detector selector, shown in block form in FIG. 1, at least a pair of which are situated at each monitored intersection.
FIG. 10 is a schematic diagram of an isolator amplifier, such as that shown in block form in FIG. 7.

*Detector selector—FIGURE 3*

Turning now to FIG. 3, there is shown a detector selector, such as that employed in the split transponder of FIG. 1. Although selector 14, responsive to arterial traffic conditions, is shown, it is clear that selector 15, responsive to cross street traffic conditions, comprises similar circuitry.

A pair of relays 30 and 31 is utilized in response to eastbound vehicle detections by detector 11 of FIG. 1 and westbound vehicle detections by detector 10 of FIG. 1, respectively. Positive voltage is coupled to a front contact 32 of relay 30, while negative voltage is coupled to a front contact 33 of relay 31. The heel of contact 32 is coupled through a resistor 34 to one side of a capacitor 35, the other side of which is grounded. Similarly, the heel of contact 33 is coupled through a resistor 43, to the ungrounded side of capacitor 35. Back contacts 32 and 33 are grounded. The ungrounded side of capacitor 35 is coupled to the input of an isolator amplifier 36. This isolator presents an extremely high input impedance to the voltage stored on capacitor 35, while the output impedance of isolator amplifier 36 is extremely low. Output energy from isolator amplifier 36 is supplied to the input of a polarity detector 37, which, for example, may comprise a Schmitt trigger circuit. As long as input voltage to polarity detector 37 is positive in polarity, one of two output leads is constantly energized, and as long as the input voltage is negative in polarity, the other of the output leads is constantly energized. One or the other of the polarity detector output lead therefore is always energized; whenever the polarity of applied voltage is reversed, the previously energized output lead becomes deenergized and the previously deenergized lead becomes energized. Because no phase reversal is introduced by isolator amplifier 36, as shown infra, a positive voltage stored in capacitor 35 provides positive output energy on the eastbound output lead of polarity detector 37, while negative voltage stored on capacitor 35 produces energization of the westbound output lead.

Energization of the polarity detector eastbound output lead energizes one input of a two-input AND circuit 38, while energization of the polarity detector westbound output lead energizes one input of a two-input AND circuit 39. The other input to AND circuit 38 is energized directly from the heel of contact 32, while the other input to AND circuit 39 is energized from the heel of contact 33 through a polarity inverter 40. Output voltage from AND circuit 38 fulfills one input of a two-input OR circuit 41, while output energy from AND circuit 39 fulfills the other input of the OR circuit. Output voltage from the OR circuit, constituting the split detection signal for the artery at the monitored intersection, is coupled through an amplifier 42, preferably of the emitter follower type, to the input of traffic distribution computer 16, shown in block form in FIG. 1.

The portion of the detector selector heretofore described operates in the following manner. Each eastbound vehicle detection energizes relay 30, thereby coupling positive energy to capacitor 35 through resistor 34. Similarly, each westbound vehicle detection energizes relay 31, thereby coupling negative energy to capacitor 35 through resistor 43. During intervals in which no eastbound vehicle is detected, energy stored on capacitor 35 leaks to ground through resistor 34 and back contact 32, while during intervals in which no westbound vehicle is detected, energy stored on capacitor 35 leaks to ground through resistor 43 and back contact 33. Hence, net voltage stored on capacitor 35 is dependent upon which of front contacts 32 and 33 is closed for a longer period of time. It should be noted that resistors 34 and 43 function to provide RC time constants through contacts 32 and 33 respectively, so that capacitor 35 does not abruptly charge or discharge, but rather experiences gradual voltage swings. The voltage across capacitor 35 is utilized for operating polarity detector 37; hence, depending upon the polarity of voltage across the capacitor, one input of either AND circuit 38 or 39 is energized, permitting operation of the relay contact coupled to the vehicle detector experiencing heaviest traffic flow to provide output voltages through OR circuit 41 and amplifier 42 to traffic distribution computer 16 of FIG. 1. These output voltages constitute the split detection signal as sensed by the detector experiencing heaviest traffic flow.

Those skilled in the art will recognize that isolator amplifier 36 is utilized for the purpose of preventing any undesired discharge of capacitor 35 to polarity detector 37. Thus, presence of the isolator amplifier adds to circuit accuracy by preventing the polarity detector circuit from unduly loading the capacitor.

Added circuitry may be utilized in the detector selector for the purpose of controlling energy supplied to traffic distribution computer 16 of FIG. 1 in response to offset signals, by closing switch 45 which couples the added circuitry to the ungrounded side of capacitor 35. The additional circuitry comprises a first OR circuit 46, responsive to either an eastbound or pre-eastbound offset, and a second OR circuit 47, responsive to either a westbound or pre-westbound offset. These offsets may be provided from a traffic signal controller offset computer such as that disclosed in aforementioned application Serial No. 305,967.

Output energy from OR circuit 46 is supplied to the input of a preferential eastbound bias circuit 48, while output energy from OR circuit 47 is supplied to the input of a preferential westbound bias circuit 49. Positive voltage is supplied to switch 45 from preferential eastbound bias circuit 48 through a diode 50, while negative voltage is similarly supplied to switch 45 from preferential westbound bias circuit 49 through a diode 51. It should be noted that output impedance presented by both preferential bias circuits is considerably below the ohmic value of resistors 34 and 43, enabling voltage produced by the bias circuits to swamp out the effect of voltages applied to capacitor 35 through resistors 34 and 43.

With switch 45 closed, assume either a pre-eastbound or eastbound offset signal is received at OR circuit 46. This produces a positive output voltage from preferential eastbound bias circuit 48 which positively charges capacitor 35 through diode 50 and switch 45. A positive input voltage is thus applied to polarity detector 37, thereby fulfilling one input to AND circuit 38. Only eastbound vehicle detection signals are then coupled through OR circuit 41 to traffic distribution computer 16 of FIG. 1. In similar fashion, if either a pre-westbound or a westbound offset signal is received by OR circuit 47, a negative potential is generated by preferential westbound bias circuit 49 which negatively charges capacitor 35 through diode 51 and switch 45. This causes polarity detector 37 to fulfill one input to AND circuit 39, enabling only westbound vehicle detections to actuate computer 16. Diode 50 assures that only positive voltages produced by preferential eastbound bias circuit 48 can be applied to capacitor 35, while diode 51 assures that only negative voltages produced by preferential westbound bias circuit 49 can reach capacitor 35.

Figure 3A:
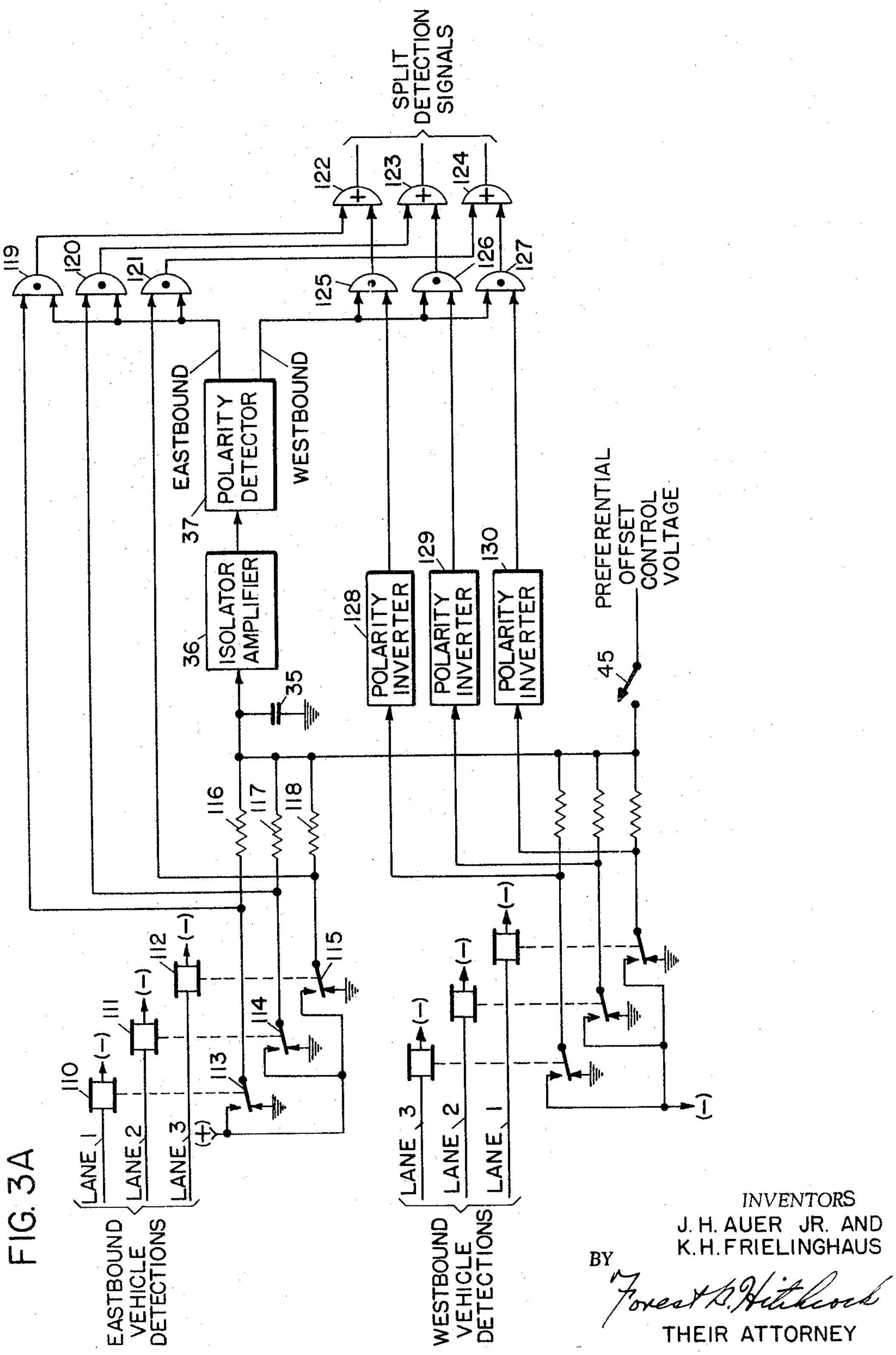
FIG. 3A is a part schematic and part block diagram of a typical detector selector which is similar in operation to the circuit of FIG. 3, for use with a six-lane artery.

*Modified detector selector—FIGURE 3A*

FIG. 3A is a modified version of the circuit of FIG. 3, showing how a detector selector may be utilized with a plurality of vehicle detectors. For example, assume the artery of FIG. 1 is a six-lane highway, having three lanes carrying traffic flow in each direction. In order to accurately sense traffic conditions on the artery, it is desirable to sense traffic conditions on each individual lane, and utilize only signals responsive to traffic conditions along the lanes carrying traffic in the direction of heaviest traffic flow. This is accomplished in the manner described below.

A separate detector is utilized to sense traffic flow along each lane on the highway. Each inner lane is designated lane 1, each center lane is designated lane 2 and each outer lane is designated lane 3. Since the function of the detector selectors is that of sensing total traffic flow in either direction and selecting the direction carrying the greatest amount of traffic, either the eastbound or westbound detectors are selected accordingly. Selection of the eastbound lanes, for example, causes selection of relays 110, 111 or 112, depending upon which detectors sensing eastbound traffic are actuated. Actuation of relay 110, 111 or 112 closes associated front contact 113, 114 or 115, respectively, thereby applying positive charge to capacitor 35 through input resistor 116, 117 or 118, respectively. Each of relays 110, 111 and 112 provides a leakage path to ground for energy stored on capacitor 35 when the relay is deenergized.

Positive voltage applied to capacitor 35 causes energization of the eastbound output lead from polarity detector 37, which then energizes one input to each of a trio of two-input AND circuits 119, 120 and 121, in parallel. The other input to each of the aforementioned AND circuits is energized through front contacts 113, 114 and 115, respectively. Outputs from AND circuits 119, 120 and 121 fulfill one input to each of two-input OR circuits 122, 123 and 124 respectively. Under these circumstances therefore, vehicle detections in eastbound lanes 1, 2 and 3 provide corresponding output signals from OR circuits 122, 123 and 124, respectively.

In similar fashion, detection of heaviest traffic flow in the westbound direction along the artery provides negative voltage to capacitor 35, which produces output voltage on the westbound output lead from polarity detector 37, in turn energizing one input to each of two-input AND circuits 125, 126 and 127, in parallel. Each vehicle detection in westbound lanes 1, 2 and 3 then fulfills the second input to AND circuits 125, 126 and 127, respectively, through respective polarity inverters 128, 129 and 130, thereby providing output voltage to the second input of OR circuits 122, 123 and 124, respectively. In this fashion, the split detection signals provided by the OR circuits represent westbound vehicle detections.

*Traffic distribution computer—FIGURE 4*

FIG. 4 is a part schematic and part block diagram of traffic distribution computer 16, shown in block form in FIG. 1. This computer comprises an operational amplifier 60 having a feedback capacitor 61 shunted across the amplifier input and output. A single input resistor 62 is coupled to the input side of the operational amplifier. Input energy is supplied to the operational amplifier through resistor 62 from a junction common to a pair of series-connected resistors 63 and 64 which comprise the load resistance of an emitter follower amplifier stage utilizing a transistor 65. Input voltage to the base of transistor 65 is supplied from detector selector 15, shown in block form in FIG. 1. This voltage represents traffic conditions in the direction of heaviest traffic flow on the cross street illustrated in FIG. 1.

A pair of operational amplifier feedback resistors 66 and 67 are provided, each having one side coupled to the input side of operational amplifier 60 and the other side coupled respectively to the collector of transistors 68 and 69. The emitters of transistors 68 and 69 are both coupled to the anode of a diode 70, the cathode of which is coupled to the output side of operational amplifier 60. Output voltage from transistor 68 is developed across a collector load resistor 71, while output voltage from transistor 69 is developed across a collector load resistor 72. It should be noted that due to the phase reversal inherent in the operational amplifier, positive input voltage applied to the operational amplifier produces negative output voltage. This negative voltage is supplied to the emitters of transistors 68 and 69 from the output side of operational amplifier 60 through diode 70, thereby biasing the emitters at a negative potential with respect to the collectors. Negative bias voltage is supplied to the base of transistor 68 through a series-connected bias resistor 73 and base input resistor 74. Similarly, negative bias voltage is supplied to the base of transistor 69 through a series-connected bias resistor 75 and base input resistor 76.

Base input voltages to transistor 68 are supplied from the emitter of transistor 65 through a zener diode 77 to the base input resistor 74. Similarly, base input voltages are supplied to transistor 69 from the emitter of a transistor 79 through a zener diode 78 to base input resistor 76. Transistors 68 and 69, along with their associated base and collector circuitry comprise a pair of switching circuits 82 and 83, respectively. The base of transistor 65 is responsive to input voltages supplied by detector selector 15 of FIG. 1, while the base of transistor 79 is responsive to input voltages supplied by detector selector 14 of FIG. 1. These input voltages represent traffic conditions along the artery of FIG. 1 as monitored by the detector sensing traffic in the direction of heaviest flow. Output voltages from transistor 79 are developed across an emitter load resistor 80. It should be noted that zener diode 77 is reverse-biased by negative anode voltage supplied through resistor 73, while zener diode 78 is reverse-biased by negative anode voltage supplied through resistor 75. Each zener diode is normally operated in its broken-down condition so as to exhibit a constant voltage drop independent of current flow. Hence, the base of transistor 68 is maintained at a constant potential below that existing on the emitter of transistor 65, while the base of transistor 69 is maintained at a constant potential below that existing on the emitter of transistor 79.

Output voltages from operational amplifier 60 are supplied to the input of an averaging circuit 84. This circuit introduces a long time constant, which is necessary in order to provide an output voltage of amplitude representing an average of input voltage amplitudes measured over a period of time. A circuit for performing such operation is disclosed in detail in J. H. Auer, Jr. application Ser. No. 294,936, filed July 15, 1963, now Patent No. 3,224,523. Output voltage from the averaging circuit is then applied to the input of an amplifier 85, the output of which is then coupled to comparator 17, shown in block form in FIG. 1. Amplifier 85 is preferably of the emitter follower type, since high current gain and low output impedance are necessary in order to enable the comparator of FIG. 1 to function properly.

In operation, signals are received at the base of transistor 65 from detector selector 15, and at the base of transistor 79 from detector selector 14, in response to detected traffic conditions. Each vehicle sensed by a detector produces a positive output voltage on the emitter of the transistor to which it is coupled through a detector selector. This positive output voltage is coupled through a zener diode to the base of the associated switching transistor in the output circuit of operational amplifier 60, thereby driving the transistor into conduction and coupling the associated feedback resistor to the output side of the operational amplifier.

More specifically, output voltage from detector selector 15 produces conduction of transistor 65, thereby causing a positive voltage to exist across resistor 64, and a larger positive voltage to exist across the series combination of resistors 63 and 64. Under these circumstances, a positive potential is supplied to the input of operational amplifier 60 through resistor 62. Simultaneously, a positive potential is supplied through zener diode 77 to the junction common to resistors 73 and 74. This positive voltage is felt at the base of transistor 68 through resistor 74, driving the transistor into conduction. Resistor 66 is thereby coupled to the output side of operational amplifier 60 through transistor 68 and diode 70, thus functioning as a shunt feedback resistor across the operational amplifier during the interval in which a signal is received from detector selector 15. Upon cessation of the signal from detector selector 15, the emitter voltage on transistor 65 falls to substantially ground potential. This voltage decrease is coupled through zener diode 77 and resistor 74 to the base of transistor 68, driving the transistor out of conduction. Feedback resistor 66 is thereupon removed from its shunt position across the operational amplifier.

In similar fashion, signals provided from detector selector 14 create a large voltage drop across resistor 80, driving the base voltage on transistor 69 positive through zener diode 78. This drives transistor 69 into conduction, thereby coupling feedback resistor 67 to the output side of operational amplifier 60 through transistor 69 and diode 70. Upon cessation of signals from detector selector 14, base voltage on transistor 69 decreases, driving the transistor 69 out of conduction. Resistor 67 is thus removed from its shunt connection across operational amplifier 60.

It should be noted that output potential from transistor 79 is not supplied to the input of operational amplifier 60. The net effect is that signals received by transistor 65 from detector selector 15 in response to traffic conditions on the cross street of FIG. 1 appear in both the numerator and denominator of a fraction represented by output voltage from the operational amplifier, while signals provided from detector selector 14 in response to traffic conditions on the artery of FIG. 1 appear only in the denominator of this fraction. This fraction may be expressed as the parameter $$\frac{C}{C+A}$$

where C represents cross street traffic and A represents arterial traffic.

Because the value of the aforementioned parameter may continuously vary due to rapidly changing traffic conditions, it must be continually monitored; if these changes represent merely short term changes without an attendant long term change, it is desirable to ignore them in computing split. To do otherwise would have the effect of continuously disrupting smooth traffic flow. Hence, averaging circuit 84 is utilized in order to make the system insensitive to short term changes and responsive only to long term changes.

That output potential provided by operational amplifier 60 represents the parameter $$\frac{C}{C+A}$$

may be proven as follows:

Let T be any fixed time interval.

Let $P_c$ represent the percent of time interval T in which a voltage is supplied from detector selector 15.

Let $P_A$ represent the percent of time interval T in which a voltage is supplied from detector selector 14.

Let $t_c$ represent the actual time in interval T during which a voltage is supplied from detector selector 15.

Let $t_A$ represent the actual time in interval T during which a voltage is supplied from detector selector 14.

Hence, $P_c$=lane occupancy measured by detector selector 15, whereby $$P_c=\frac{t_c}{T}$$

and $P_A$=lane occupancy measured by detector selector 14, whereby $$P_A=\frac{t_A}{T}$$

Let $E_1$=the positive reference voltage amplitude.

Let $E_2$=output voltage amplitude of amplifier 60.

Let $R$=ohmic value of input resistor 62.

Let $R_c$=ohmic value of feedback resistor 66.

Let $R_A$=ohmic value of feedback resistor 67.

Let $R_1$=ohmic value of resistor 63.

Let $R_2$=ohmic value of resistor 64.

Let $I$=average current through resistor 62 during time T.

Let $I_c$=average current through resistor 66 during time T.

Let $I_A$=average current through resistor 67 during time T.

Let $Q$=total charge applied to capacitor 61 during time T.

Hence, $$Q=(I+I_c)t_c+I_At_A \quad (1)$$

Assuming transistors 65 and 79 operate as ideal switches, $$I=\frac{E_1\frac{R_2}{R_1+R_2}}{R}=\frac{E_1R_2R}{R_1+R_2}$$

Assuming transistors 68 and 69 operate as ideal switches also, and diode 70 operates as an ideal diode, $$I_c=\frac{E_2}{R_c} \text{ and } I_A=\frac{E_2}{R_A}$$

Hence, $$Q=\frac{E_1R_2R}{R_1+R_2}+\frac{E_2}{R_c}t_c+\frac{E_A}{R_A}t_A \quad (2)$$

Since, $$P=\frac{t}{T}$$

generally, then $t=PT$. Hence, $$Q=\frac{E_1R_2R}{R_1+R_2}+\frac{E_2}{R_c}P_cT+\frac{E_2}{R_A}P_AT \quad (3)$$

Assuming the value of capacitor 61 is sufficiently large, the change in amplitude of voltage $E_2$ during interval T is sufficiently reduced so that the total charge applied to the capacitor during time T, as expressed by equation (3), is within a fraction of a percentage of the actual value. Asuming further that the repetitive operation of the vehicle detectors at the monitored intersection sensing heaviest traffic flow on both the artery and cross street remains substantially uniform for a sufficiently large time interval, voltage $E_2$ approaches an equilibrium value such that the change of charge on capacitor 61 during interval T is zero. Assuming also that $$R_c=R_A=r$$

Equation 3 may be written $$O=\frac{E_1R_2R}{R_1+R_2}P_c+\frac{E_2}{r}P_c+\frac{E_2}{r}P_A \quad (4)$$

Hence, $$E_2=-\frac{P_c\frac{E_1R_2R}{R_1+R_2}}{\frac{P_c+P_A}{r}} \quad (5)$$

or $$E_2=\frac{E_1R_2Rr}{R_1+R_2}\frac{P_c}{P_c+P_A} \quad (6)$$

Since, $E_1$, R, $r$, $R_1$ and $R_2$ are all constants, operational amplifier 60 output voltage $E_2$ is proportional to the parameter $$\frac{P_c}{P_c+P_A} \quad (7)$$

Moreover, since $P_c$ and $P_A$ are measurements of traffic congestion indicated generally by the terms C and A respectively, Parameter 7 may be written as $$\frac{C}{C+A} \quad (8)$$

Figure 4A:
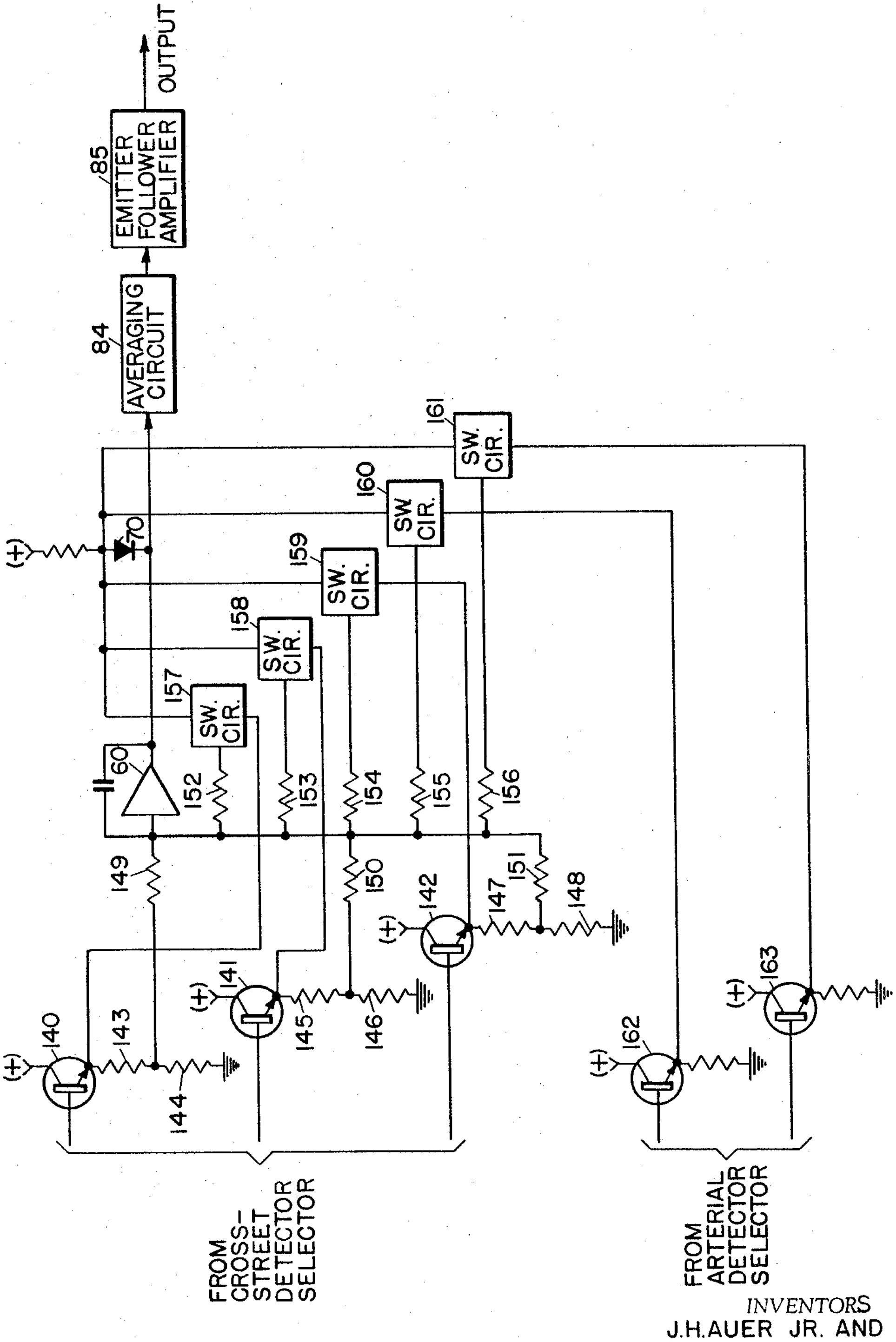
FIG. 4A is a part schematic and part block diagram of a traffic distribution computer which is similar in operation to the computer of FIG. 4, for use with the intersection of a six-lane artery with a four-lane cross street.

*Modified traffic distribution computer—FIGURE 4A*

Turning now to FIG. 4A, there is shown a modification of the computer circuit of FIG. 4 for accepting outputs from detector selectors such as those illustrated in FIG. 3A which are utilized with an artery carrying two lanes of traffic flow in either direction and a cross street carrying three lanes of traffic flow in either direction. Output voltages from the three OR circuits used in the detector selector of FIG. 3A are thus supplied to the bases of transistors 140, 141 and 142. The emitters of each of the aforementioned transistors are coupled to ground through a pair of series-connected resistors 143 and 144, 145 and 146, and 147 and 148, respectively. Input voltages are supplied to operational amplifier 60 through input summing resistors 149, 150 and 151 from the junction common to resistors 143 and 144, resistors 145 and 146, and resistors 147 and 148, respectively. Hence, the voltage supplied to the input of operational amplifier 60 is a composite sum of the input voltages separately applied thereto.

The computer also utilizes a group of feedback resistors 152, 153, 154, 155 and 156. Each feedback resistor is coupled to the anode of diode 70 through a switching circuit 157, 158, 159, 160 and 161, respectively. These switching circuits are similar in configuration to switching circuits 82 and 83, shown in FIG. 3 and described in conjunction therewith. Control signals for switching circuits 157, 158 and 159 are supplied from the emitters of transistors 140, 141, and 142, respectively.

Output signals are provided from the detector selector responsive to cross street traffic, which is of circuit configuration similar to that shown in FIG. 3A except that only two lanes in each direction are sensed and therefore only two output OR circuits are necessary. These output signals are supplied to the bases of transistors 162 and 163 from the respective output OR circuits. Transistors 162 and 163 are connected as emitter follower amplifiers, similar to transistors 140, 141 and 142. Output voltages appearing at the emitters of transistors 162 and 163 are utilized for controlling switching circuits 160 and 161, respectively.

In operation, a signal received by any of the transistors illustrated in FIG. 4A operates to close the switching circuit associated therewith, thereby coupling the associated feedback resistor into the circuit. In addition, a signal received by any of transistors 140, 141 and 142 operates to supply an input voltage to operational amplifier 60. Hence, in a manner analogous to that used in deriving the output parameter of the circuit of FIG. 4, the output parameter produced by the circuit of FIG. 4A may be determined to be $$\frac{(C_1+C_2+C_3)}{(C_1+C_2+C_3)+(A_1+A_2)}$$

where:

$A_1$ represents traffic conditions on lane 1 of the artery in the selected direction;

$A_2$ represents traffic conditions on lane 2 of $C_1$ represents traffic conditions on lane 1 of the cross street in the selected direction, $C_2$ represents traffic conditions on lane 2 of the cross street in the selected direction, and $C_3$ represents traffic conditions on lane 3 of the cross street in the selected direction.

FIG. 5 illustrates the intersection of a second cross street with an intersection of configuration shown in FIG. 1, along with associated monitoring circuitry. In addition to vehicle detector selection made on the artery and cross street by detector selectors 23 and 24 respectively, a selection of one of second cross street detectors 21 and 22 is made by a third detector selector 25. Each detector selector is similar in configuration to detector selectors 14 and 15 of FIG. 1. Output voltages produced by the three selected detectors are supplied to a pair of traffic distribution computers 26 and 27. Computer 26 produces a parameter representing the first optimum split for the intersection, while computer 27 produces a parameter representing the second optimum split for the intersection. These parameters are supplied in the form of analog voltages to comparators 28 and 29, respectively, which, in response to staircase voltages produced by means such as staircase counter 19 of FIG. 1, are converted to digital form for acceptance by the arterial master split computer, such as master split computer 18 of FIG. 1.

Figure 5A:
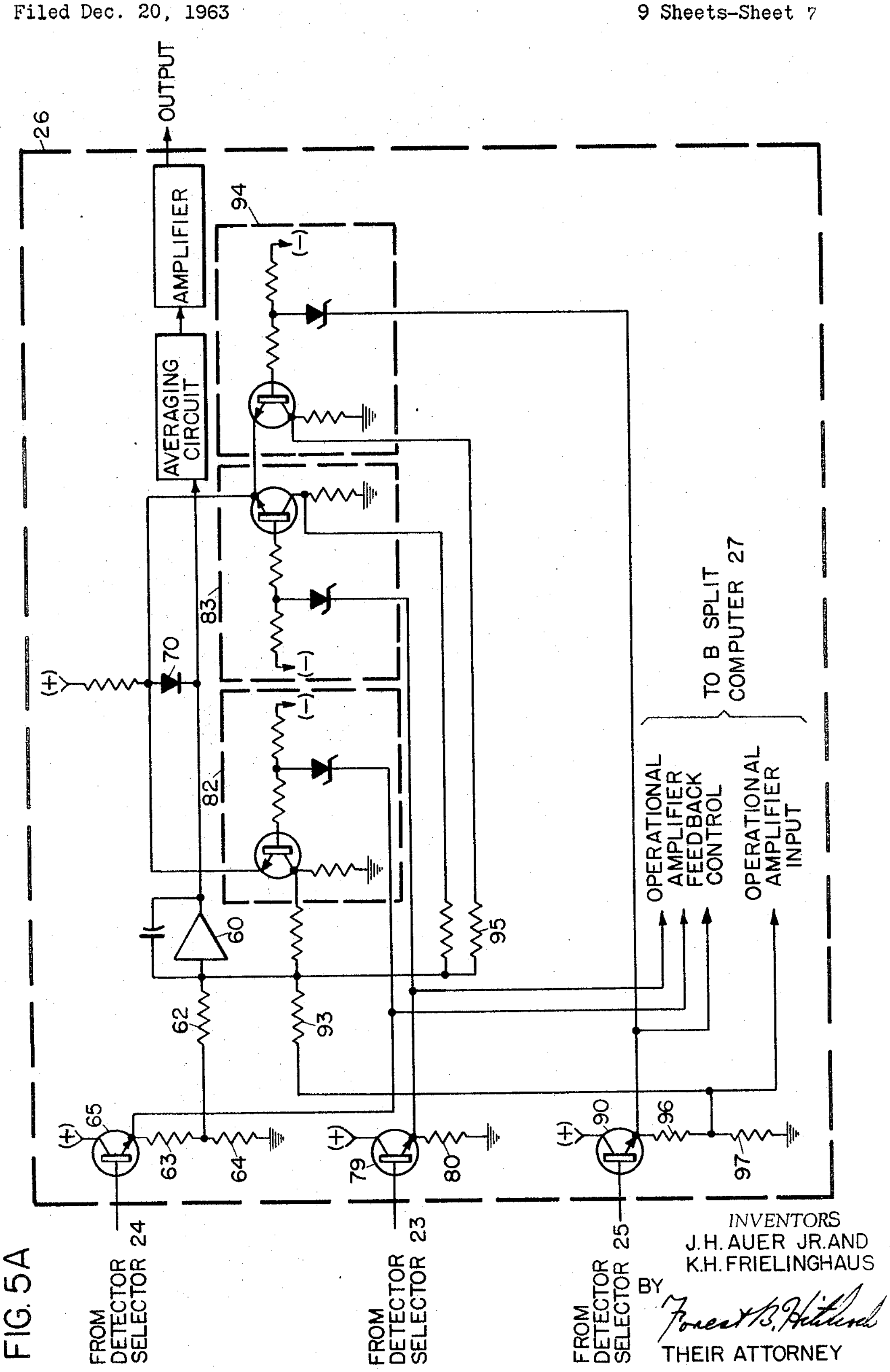
FIG. 5A is a part schematic and part block diagram of a traffic distribution analog computer for use at a three-phase intersection.

FIG. 5A is a part schematic and part block diagram of traffic distribution computer 26 of FIG. 5, which is similar in configuration to that shown in FIG. 4, modified for use at a three-phase intersection. As in FIG. 4, transistor 65 is responsive to a cross street detector selector such as selector 24 of FIG. 5, and transistor 79 is responsive to an arterial detector selector such as selector 23 of FIG. 5. However, an additional input transistor 90, connected as an emitter-follower amplifier, is added to the circuit. This transistor is made responsive to a third detector selector such as selector 25 of FIG. 5, which selects a detector sensing traffic in the heaviest direction along the second cross street at the intersection. The emitter resistance coupled to transistor 90 comprises a pair of series-connected resistors 96 and 97. A second input resistor 93 is coupled to the input of operational amplifier 60 from the junction common to resistors 96 and 97. In addition, a third switching circuit 94, of configuration identical to that of switching circuits 82 and 83, is added to the computer for coupling a shunt feedback resistor 95 from the input of operational amplifier 60 to the anode of diode 70. Control voltage for switching circuit 94 is supplied from the emitter of transistor 90.

*Computer—Figure 5A*

The computer of FIG. 5A provides an output parameter which may be represented as $$\frac{B+C}{A+B+C}$$

where C represents a measure of traffic congestion on the cross street, B represents a measure of traffic congestion on the second cross street, and A represents a measure of traffic congestion on the artery. This may be proven by mathematical analysis similar to that performed in conjunction with the explanation of FIG. 4, supra. This parameter represents the second optimum split for the three-phase intersection of FIG. 5, that is, the split between phases C and A. This is also known as the C split.

Because the computer of FIG. 5A is used for calculating optimum split between phases C and A, it is necessary to separately calculate the split between phases B and C. For this purpose, a second computer, similar in configuration to that shown in FIG. 5A is also necessary. However, separate input transistors are unnecessary; input voltages supplied to the computer are resistively coupled to the input side of the operational amplifier used therein from the junction common to emitter resistors 96 and 97, while the switching means utilized for shunting feedback resistors across the input and output of the operational amplifier are controlled by input voltages from the emitters of transistors 65, 79 and 90, respectively. By virtue of the mathematical analysis presented to aid in explaining operation of the circuit of FIG. 4, it can be deducted that the output parameter from the analog computer providing a B split signal provides an output voltage representative of the parameter $$\frac{B}{A+B+C}$$

which represents the first optimum split for the three-phase intersection shown in FIG. 5.

Figure 6:
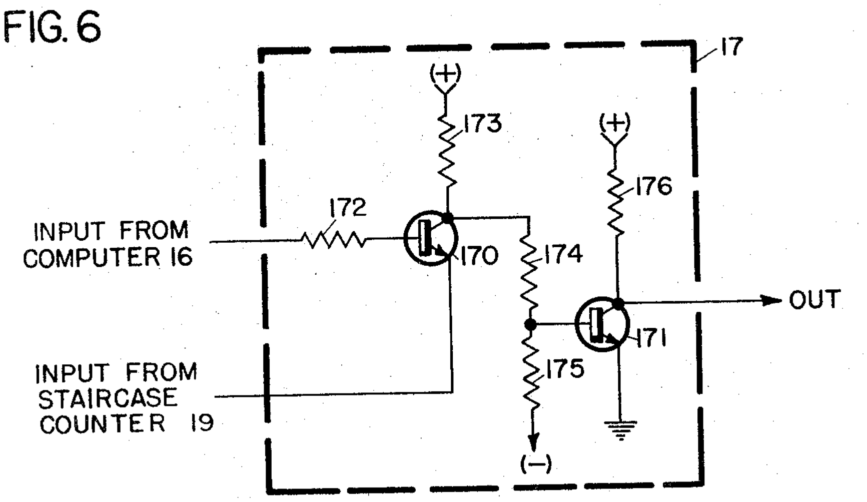
FIG. 6 is a schematic diagram of the comparator shown in block form in FIG. 1.

*Comparator—Figure 6*

Turning now to FIG. 6, there is shown a schematic diagram of a comparator used with a typical split transponder, such as comparator 17, shown in block form in FIG. 1. This circuit comprises a pair of transistors 170 and 171. Positive input voltages from computer 16, shown in block form in FIG. 1, are supplied to the base of transistor 170 through a base input resistor 172. In addition, positive input voltages produced by staircase counter 19, shown in block form in FIG. 1, are coupled to the emitter of transistor 170. Positive bias is supplied to the collector of transistor 170 through a collector load resistor 173. Since transistor 170 is of the NPN type, whenever the base voltage swings positive with respect to the emitter, the transistor becomes conductive; whenever the base voltage swings negative with respect to the emitter, the transistor becomes non-conductive.

The collector of transistor 170 is coupled to the base of transistor 171 through a coupling resistor 174. Input voltage to transistor 171 is developed across a resistor 175 coupled between the negative side of the power supply and the base of transistor 171. Positive bias is supplied to the collector of transistor 171 through a collector load resistor 176. The emitter of transistor 171 is grounded.

In operation, whenever input voltage from computer 16 exceeds input voltage from staircase counter 19, transistor 170 is in a conductive condition, and collector current is drawn through resistor 173. This drops the potential coupled to resistor 174 from the collector of transistor 170, driving the base voltage on transistor 171 negative with respect to the emitter. Transistor 171 thus draws substantially no collector current through resistor 176, thereby providing a positive voltage output to split computer 18, shown in block form in FIG. 1.

As cycle rate pulses continue to be received by staircase counter 19, the amplitude of voltage provided therefrom eventually surpasses the amplitude of voltage supplied from computer 16. This causes the emitter voltage on transistor 170 to swing positive with respect to the base, thereby cutting off the transistor. Collector voltage on transistor 170 thus swings positive, thereby driving the base voltage on transistor 171 positive. This causes transistor 171 to conduct, thereby dropping output voltage supplied by the comparator to the split computer to a value equal to the collector-to-emitter drop across transistor 171, which for practical purposes may be considered zero. Under these conditions, no output voltage is supplied to computer 18 from the collector of transistor 171.

As the input voltage amplitude from staircase counter 19 continues to rise, transistor 171 remains conductive, thereby maintaining zero output voltage to computer 18. However, when the staircase counter receives a sync pulse from fifties counter 20, output voltage amplitude supplied by the staircase counter drops to zero. Hence, base voltage on transistor 170 is driven positive once again, with respect to the emitter, causing the transistor to resume conduction. Base voltage on transistor 171 is thus driven negative, halting conduction, resulting in a positive output potential being supplied to split computer 18.

*Staircase counter—Figure 7*

Referring next to FIG. 7, there is shown a part schematic and part block diagram of a staircase counter used with a typical split transponder, such as staircase counter 19, shown in block form in FIG. 1. Cycle rate pulses are supplied to the input of a monostable multivibrator 180, which provides an output pulse of controlled width in response to each received cycle rate pulse. This effectively reshapes the cycle rate pulses which may be received in somewhat distorted form due to attenuation introduced by the means communicating the cycle rate pulses from the cycle computer.

Each pulse provided from monostable multivibrator 180 triggers a constant current generator 181, thereby supplying a constant amplitude current to a capacitor 182 throughout the duration of each pulse generated by the multivibrator. By this means, capacitor 182 is charged at a controlled rate in discrete steps, each step occurring during generation of an output pulse from the multivibrator. An isolator amplifier 183 is utilized for coupling output voltage to comparator 17 in order to prevent the comparator, which has a relatively low input impedance, from discharging capacitor 182.

A single sync pulse is supplied to a reset switch 184 from fifties counter 20 each time 50 cycle rate pulses have been supplied to monostable multivibrator 180. This reset switch, during receipt of a sync pulse, presents a low impedance path across capacitor 182, thereby discharging the voltage stored on capacitor 182 to zero. Each subsequent successive cycle rate pulse causes a fixed increment of charge to be applied to capacitor 182, until, after fifty cycle rate pulses have been received, a sync pulse momentarily causes the reset switch to shunt capacitor 182 with a low impedance path, thereby discharging the capacitor in preparation for resumption of the next complete cycle.

Figure 8:
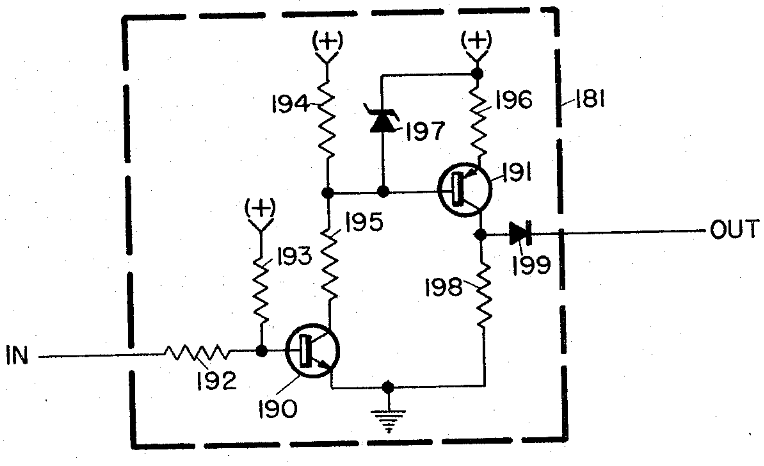
FIG. 8 is a schematic diagram of the constant current generator shown in block form in FIG. 7.

*Constant current generator—FIGURE 8*

FIG. 8 is a schematic diagram of constant current generator 181, shown in block form in FIG. 7. The circuit comprises an NPN transistor 190 and a PNP transistor 191. Positive input signals are supplied to the base of transistor 190 from monostable multivibrator 180, shown in block form in FIG. 7, through a base input resistor 192. Positive base bias is supplied to the base of transistor 190 through a resistor 193. Positive collector bias is supplied to transistor 190 through a collector load resistor 194 in series with a collector bias resistor 195. Base input voltages for transistor 191 are supplied from the junction common to resistors 194 and 195. Emitter bias is supplied to transistor 191 through a resistor 196, while an avalanche breakdown device, such as a zener diode 197 is employed to provide a constant base voltage for transistor 191 when transistor 190 is in a conductive condition. The collector of transistor 191 is held at ground potential by a resistor 198 whenever transistor 191 is in a non-conductive condition and by a back-biasing diode 199 whenever capacitor 182 of FIG. 7 is positively charged. Diode 199 is of a low reverse leakage type, thereby completely decoupling transistor 191 from storage capacitor 182 whenever the transistor is in a non-conductive condition. By controlling both the width of pulses supplied by monostable multivibrator 180 and the base voltage of transistor 191, extremely accurate increments of charge are applied to capacitor 182 in response to each operation cycle of monostable multivibrator 180.

Operation of the constant current generator takes place as follows. Each positive pulse produced from monostable multivibrator 180 triggers transistor 190 into conduction. This causes a large increase in voltage drop across resistor 194, driving the base voltage on transistor 191 in a negative direction. This negative voltage swing then causes transistor 191 to conduct. Zener diode 197 maintains a constant base voltage on transistor 191, thereby maintaining constant collector current flow through the transistor. The amplitude of this constant current is controllable by adjusting either the value of emitter resistor 196 or the value of the constant base voltage supplied to transistor 191. The constant current is then coupled through diode 199 to storage capacitor 182.

After the input pulse from monostable multivibrator 180 is completed, base voltage on transistor 190 swings in a negative direction, causing the transistor to become nonconductive. Base voltage on transistor 191 then swings in a positive direction, driving the transistor out of conduction. Current flow through diode 199 to storage capacitor 182 is thereby halted. Those skilled in the art will recognize that diode 199 must be of a low-leakage variety in order to prevent leakage to ground of charge stored on capacitor 182, through diode 199 and resistor 198 in series. Thus, constant current generator 181 of FIG. 7 presents a high output impedance to capacitor 182.

Figure 9:
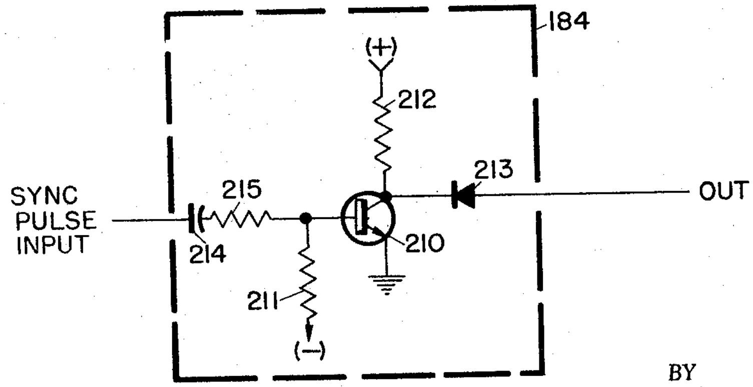
FIG. 9 is a schematic diagram of the reset switch, shown in block form in FIG. 7.

*Reset switch—FIGURE 9*

FIG. 9 is a schematic diagram of reset switch 184, shown in block form in FIG. 7. The circuit comprises a transistor 210 receiving negative base bias through a resistor 211. Positive collector bias is supplied through a collector load resistor 212. The emitter is grounded. A low-leakage diode 213 is coupled from the collector to the ungrounded side of capacitor 182. Positive sync pulses are supplied to the base of the transistor from fifties counter 20, shown in block form in FIG. 1, through a coupling capacitor 214 in series wtih a base input resistor 215.

In operation, the transistor is normally in a non-conductive condition, due to negative bias supplied to the base. Each positive input pulse supplied from fifties counter 20 then drives the base voltage positive, causing conduction. This lowers the collector voltage, thereby biasing diode 213 in the forward direction. Output impedance presented by the reset switch therefore decreases to a very low value, and capacitor 182 thus discharges through a series circuit comprising diode 213 and transistor 210, to ground. Upon completion of the sync pulse, base voltage is again driven in a negative direction, causing the transistor to become non-conductive. The collector voltage thereupon rises to a potential which back-biases diode 213. Once again, therefore, the reset switch presents a large output impedance to capacitor 182.

*Isolator amplifier—FIGURE 10*

FIG. 10 is a schematic diagram of a typical isolator amplifier used wherever the circuits of the instant invention require a high input impedance-low output impedance direct-current amplifier. The circuit utilizes a field-effect transistor 220, which typically displays an input impedance two orders of magnitude greater than that of ordinary bipolar transistors.

The field-effect transistor, which is preferably of the p-channel type, includes a gate electrode G, a drain electrode D and a source electrode S. Since the field-effect transistor is a voltage-controlled device, it is more analogous to a voltage-controlled vacuum tube than to a current-controlled transistor. Thus, the gate, drain and source are each analagous, respectively to a vacuum tube grid, anode and cathode. However, for a p-channel field-effect transistor, drain-to-source voltage is negative, as opposed to positive anode-to-cathode voltage of a vacuum tube, and modulation is achieved by supplying positive voltages to the gate as opposed to negative voltages supplied to the grid of a vacuum tube.

The base of a transistor 221 is connected to the drain of field-effect transistor 220. Negative emitter bias is supplied to transistor 221 through an emitter bias resistor 222. Output voltage from transistor 221 is developed across a collector load resistor 223. Negative bias is supplied to the drain of field-effect transistor 220 through a resistor 224 from the emitter of transistor 221. The collector-to-emitter circuit of transistor 221 furnishes a shunt current path for the field-effect transistor.

The source of the field-effect transistor receives substantially constant current through a source resistor 225 from the collector of a transistor 226. The emitter of transistor 226 receives positive energy through a resistor 227. The voltage drop between the source and the positive power supply voltage constitutes negative feedback for the field-effect transistor. Negative voltage is supplied through a resistor 228 to the anode of a zener diode 229, the cathode of which receives positive bias. Constant base bias is supplied to transistor 226 from the anode of zener diode 229, so that a substantially constant collector current flows through transistor 226. Hence, a substantially constant voltage appears across resistor 225. This voltage is adjusted to be approximately equal and opposite to the gate-to-source voltage of the field-effect transistor, so that voltage measured between the gate of the field-effect transistor and the collector of transistor 226 is substantially zero. Since output voltage is supplied from the collector of transistor 226, the gain of the circuit must therefore be substantially 1.

The collector-to-emitter circuit of transistor 221 tends to maintain the proper source voltage on the field-effect transistor, by forming a conducting path from the source to resistor 222. It will be noted that as drain current tends to increase, due to an increasingly negative gate potential, base-to-emitter voltage on transistor 221 swings in a positive direction, causing transistor 221 to conduct more heavily. This swings the source voltage of the field-effect transistor in a negative direction by an amount equal to the change in gate potential, by increasing the voltage drop across resistor 223 and across transistor 226. Transistor 221 adjusts the source voltage to the proper value, since the drain voltage is indicative of gate-to-source bias. The small changes in potential between the drain of the field-effect transistor and the emitter of transistor 221 adjust the operating point of transistor 221 so as to maintain a costant gate-to-source bias potential which is independent of gate potential itself.

Input impedance of a field-effect transistor is a function of the source-to-drain supply voltage, which, in FIG. 10, is the potential between the source and the junction common to resistors 224 and 222. By maintaining this potential constant, the field-effect transistor input impedance is correspondingly maintained constant.

The base of a transistor 230 is coupled to the collector of transistor 221. The emitter of transistor 230 is coupled to the cathode of a zener diode 231, the anode of which is coupled to the emitter of transistor 221. Transistor 230 maintains the source-to-drain supply voltage constant, since the base of transistor 230 is held at substantially the same potential as the source. Zener diode 231 adds a fixed potential difference between the emitter of transistor 230 and the junction common to resistors 222 and 224. Hence, as potential on the base of transistor 230 changes, the voltage at the junction common to resistors 222 and 224 changes by the same amount. In this manner, the source-to-drain supply potential is maintained constant, even though gate potential, and likewise source potential, is changed.

As source-to-drain supply voltage decreases, the field-effect transistor input impedance increases. However, the source-to-drain potential must be made to exceed the pinch-off voltage of the field-effect transistor in order to maintain the pentode-like characteristics of the field-effect transistor.

A field-effect transistor is typically operated in a cathode-follower type of circuit configuration. Due to the functional similarity between a field-effect transistor and a vacuum tube, the source is actually forward-biased by several volts, with respect to the gate. The value of this gate-to-source bias is constant for all gate potentials in the operating range. Since it is intended that the output voltage always be equal to the input voltage, a constant counter-bias is maintained across resistor 225.

Since a substantially constant current is maintained through resistor 225, as input voltage supplied to the gate electrode of field-effect transistor 220 varies, output potential supplied by the isolator amplifier varies in substantially the same manner. Thus, configuration of the isolator amplifier of FIG. 10 may be designated a source-follower amplifier. Moreover, gate-to-source potential is maintained at an approximately constant value on the field-effect transistor, the value of isolator amplifier input impedance, which, as previously stated, is extremely high, is maintained substantially constant. Hence, loading effects produced by the isolator amplifier upon a signal source are negligible.

Figure 11:
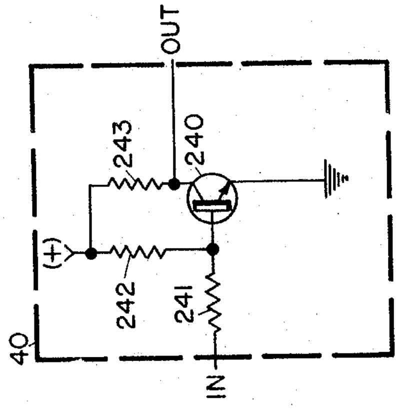
FIG. 11 is a schematic diagram of the polarity inverter, shown in block form in FIG. 3.

*Polarity inverter—FIGURE 11*

FIG. 11 is a schematic diagram of a polarity inverter, such as polarity inverter 40 shown in block form in FIG. 3. This circuit is used for converting negative voltages to positive voltages of similar magnitude. The inverter comprises a transistor 240 responsive to negative input potentials through a base input resistor 241. Positive base bias is supplied through a resistor 242, and positive collector bias is supplied through a load resistor 243. The emitter of transistor 240 is grounded.

In operation, when no input potential is supplied to the base of transistor 240, the transistor is in a conductive condition because of the positive base bias supplied through resistor 242. Hence, output potential supplied from the collector of transistor 240 is substantially zero.

Upon receipt of a negative input potential, the base voltage on transistor 240 is driven negative, causing collector-to-emitter current flow to cease. Substantially no voltage drop thus appears across resistor 243, so that output potential supplied by the polarity inverter rises to a highly positive value. When the negative input signal is no longer supplied to the base of transistor 240, the transistor again resumes conduction, and a large voltage drop appears across resistor 243. Output potential supplied by the polarity inverter thereupon falls substantially to zero.

Figure 12:
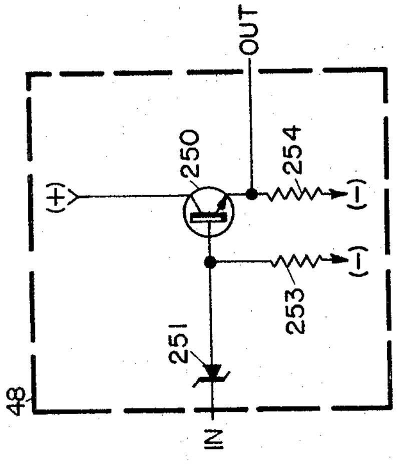
FIG. 12 is a schematic diagram of the preferential eastbound bias circuit, shown in block form in FIG. 3.

*Preferential eastbound bias circuit—FIGURE 12*

FIG. 12 is a schematic diagram of preferential eastbound bias circuit 48, shown in block form in FIG. 3. The circuit comprises a transistor 250 receiving positive input voltage from OR circuit 46 of FIG. 3, through a reverse-poled zener diode 251. Negative bias is supplied to the base of the transistor through a bias resistor 253 and to the emitter of the transistor through a load resistor 254. Positive potential is directly coupled to the collector of the transistor, while output voltage is supplied from the emitter.

In operation, as long as no input signal is supplied to zener diode 251 from OR circuit 46, transistor 250 is non-conductive, and negative output voltage is supplied from the emitter. This voltage does not appear on switch 45 of FIG. 3, due to the presence of diode 50, which, under these signal conditions, is back-biased. However, when a positive input voltage is supplied to diode 251 from OR circuit 46, the transistor becomes conductive. Collector-to-emitter current then flows through the transistor and through emitter resistor 254, thereby providing a positive output voltage to the ungrounded plate of capacitor 35 through diode 50, which is now forward-biased. This condition occurs for as long as positive potential is received from OR circuit 46. However, when this potential is no longer present, base voltage swings negative, again rendering the transistor non-conductive. Output potential supplied from the transistor then drops to a negative value, halting current flow to capacitor 35 therefrom. It should be noted that the output impedance presented by the preferential eastbound bias circuit when transistor 250 is conducting is much less than the ohmic value of resistors 34 and 43 of FIG. 3. Hence, current flow through diode 50 to capacitor 35 in the circuit of FIG. 3 is sufficient to swamp out the effects of voltages supplied to capacitor 35 from front contacts 32 and 33 of relays 30 and 31, respectively, through resistors 34 and 43, respectively. Zener diode 251 assures that only positive voltages above a preselected value will render the transistor conductive.

Figure 13:
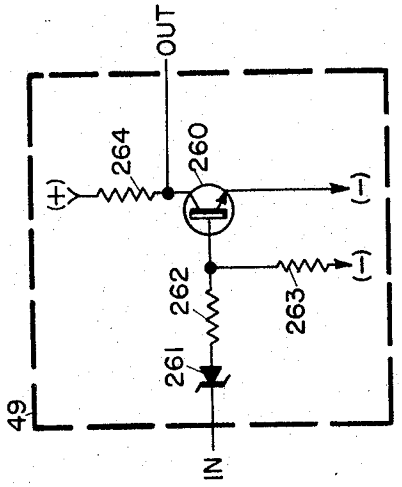
FIG. 13 is a schematic diagram of the preferential westbound bias circuit, shown in block form in FIG. 3.

*Preferential westbound bias circuit—FIGURE 13*

Turning next to FIG. 13, there is shown a schematic diagram of preferential westbound bias circuit 49, shown in block form in FIG. 3. This circuit comprises a transistor 260 receiving positive input voltage through a reverse-poled zener diode 261 in series with a base input resistor 262 from OR circuit 47 of FIG. 3. Negative base bias is supplied through a resistor 263. Positive collector bias is supplied through a collector load resistor 264. The emitter of transistor 260 is directly coupled to the negative bias source. Output voltage is supplied from the collector of transistor 260.

In operation, assume no input voltage is supplied from OR circuit 47 to the base of transistor 260. Under these conditions, transistor 260 is in a non-conductive condition, and output voltage supplied therefrom is highly positive. This voltage back-biases diode 51 in FIG. 3, thereby preventing collector voltage on transistor 260 from reaching switch 45. However, the transistor is driven into conduction when a positive voltage is supplied to the base from OR circuit 47. Collector current then flows through resistor 264, causing the output voltage provided by the circuit to switch to a negative value. Under these conditions, diode 51 of FIG. 3 becomes forward-biased, and capacitor 35 acquires a negative charge. Again, since output impedance of preferential westbound bias circuit 49 is considerably below the ohmic value of resistors 34 and 43 of FIG. 3, the effect of voltages supplied to capacitor 35 through contacts 32 and 33 is swamped out whenever switch 45 is closed. It should be noted that zener diode 261 assures that only positive voltages above a preselected value will render transistor 260 conductive.

*Master split computer—FIGURE 14*

FIG. 14 is a part block and part schematic diagram of master split computer 18, shown in block form in FIG. 1. This circuit receives split input signals from comparators situated at monitored intersections along the artery, and provides an output voltage comprising a split signal, which is then supplied to traffic signal local controllers located at intersections along the artery. As explained in connection with FIG. 6, supra, each split input signal supplied from a comparator to the master split computer comprises a constant amplitude positive voltage during the fractional portion of each signal cycle represented by the value $$\frac{C}{A+C}$$

for a two phase intersection. The comparator output voltage is illustrated by waveform E of FIG. 2. For three-phase intersections, two traffic distribution computers must be utilized, as shown in FIG. 5, computer 26 providing an output voltage representing the parameter $$\frac{B+C}{A+B+C}$$

and computer 27 providing an output voltage representing the parameter $$\frac{B}{A+B+C}$$

Each of the aforementioned parameters is supplied to a separate comparator, as shown in FIG. 5. The output of each comparator is applied to a separate master split computer, such as that shown in FIG. 14. The master split computer may receive inputs from two-phase or three-phase intersections, or both. For simplicity of explanation, operation of the master split computer of FIG. 14 will be described only in connection with operation in response to detections at two-phase intersections.

The computer comprises an operational amplifier 300 having a feedback capacitor 301 shunted across the amplifier input and output terminals. Cycle rate pulses are supplied from a cycle rate signal generator, such as that described in aforementioned application Ser. No. 306,036, to a relay 302 having a pair of associated contacts 303 and 304. The heel of contact 303 is coupled to a capacitor 305, while front contact 303 is coupled to an operational amplifier input resistor 306 and back contact 303 is coupled to the output of operational amplifier 300 through a feedback resistor 307. Similarly, the heel of contact 304 is coupled to a capacitor selector switch 308 through a resistor 309.

Although computer 18 may be used with any number of split input signals, depending upon the number of intersections monitored, for simplicity the computer is illustrated receiving but three input signals. Each split input signal is supplied to a separate one of relays 310, 311 and 312, each relay having associated therewith a pair of contacts 313 and 314, 315 and 316, and 317 and 318, respectively. Front contacts 313, 315 and 317 are each coupled to a capacitor 319, 320 and 321, respectively, through a resistor 322, 323 and 324, respectively. In addition, the heels of contacts 314, 316 and 318 are each coupled to a separate capacitor 325, 326 and 327, respectively. Front contacts 313, 315 and 317 are each connected to the heel of contact 304. Front contacts 314, 316 and 318 are each coupled to the input of amplifier 300 through input resistors 328, 329 and 330, respectively. In addition, front contact 304 is coupled to the input of amplifier 300 through an input resistor 331. Back contacts 314, 316 and 318 are each coupled to the output side of amplifier 300 through feedback resistors 332, 333 and 334, respectively. Back contact 304 is coupled to the negative side of the power supply. A meter 335 may be coupled to the output side of operational amplifier 300 for supplying visual indication of the computer composite split voltage.

Output voltage from operational amplifier 300 is supplied in parallel to a pair of analog comparators 340 and 341. In addition, a second input voltage is supplied to analog comparator 340 from the heel of contact 343 of a relay 342, while a second input voltage is supplied to analog comparator 341 from the heel of contact 345 of a relay 344. Front contact 343 receives positive energy from the tap of a potentiometer 346, while back contact 343 receives positive energy from the tap of a potentiometer 347. Similarly, front contact 345 receives positive energy from the tap of a potentiometer 348, while back contact 345 receives positive energy from the tap of a potentiometer 349. Relay 342 is driven by output voltage from an amplifier 350 in response to output voltage from analog comparator 340. Similarly, relay 344 is driven by output voltage from an amplifier 351 in response to output voltage from analog comparator 341. Master split computer output voltages are provided through a pair of contacts 352 and 353 of relays 342 and 344, respectively. Positive energy is supplied to the heel of contact 352. Hence, when relay 342 is deenergized, split voltage is supplied from back contact 352. When relay 342 is energized and relay 344 is deenergized, split voltage is supplied from front contact 352 to back contact 353. When both relays 342 and 344 are energized, split voltage is supplied through front contact 352 to front contacts 353. In this fashion, the split voltage is made responsive to the amplitude of ouput voltage produced by operational amplifier 300.

Voltage appearing at the output of operational amplifier 300 comprises an analog potential representing the parameter $$\frac{1}{3+w}\,\frac{C_a}{A_a+C_a}+\frac{C_b}{A_b+C_b}+\frac{C_c}{A_c+C_c}+wY$$

where $w$ is a weighing factor indicative of relative sizes of capacitance selected by capacitor selector switch 308 in comparison with a base value, Y is a nominal constant depending upon the ratio of the base value of capacitance selected by switch 308 to the value of capacitor 305, and whereby subscripts $a$, $b$ and $c$ designate three separate arterial intersections. For example, $A_a$ represents traffic conditions on the artery at intersection $a$, $C_a$ represents traffic conditions on the cross street at intersection $a$, $A_b$ represents traffic conditions on the artery at intersection $b$, etc.

Since the master split computer is preferably situated at a location remote from the monitored intersections along the artery, it is well to note that the above-mentioned analog parameter is compiled by computer 18 in response to digital signals received over line wires from the split transponders dispersed along the artery. This maintains information accuracy without regard to variations in line resistance, line leakage, etc. Split input signals from intersections $a$, $b$ and $c$ are received by relays 310, 311 and 312, respectively. That the output voltage supplied by operational amplifier 300 represents the above-mentioned parameter may be proven mathematically in the following manner:

Let $n$=the number of cycle rate pulses received per signal cycle. This also represents the number of times per cycle in which relay 302 pulses.

Let $E_o$ represent the output voltage amplitude of amplifier 300.

Let $E_R$ represent the negative reference voltage amplitude.

Let $K_{1a}$=capacitance of capacitor 319.

Let $K_{2a}$=capacitance of capacitor 325.

Let $K_{1b}$=capacitance of capacitor 320.

Let $K_{2b}$=capacitance of capacitor 326.

Let $K_{1c}$=capacitance of capacitor 321.

Let $K_{2c}$=capacitance of capacitor 327.

Let $K_3$=capacitance of capacitor 301.

Let $Q_A$=the amount of charge added to capacitor 301 during each signal cycle.

Let $Q_S$=the amount of charge subtracted from capacitor 301 during each signal cycle.

First, for simplicity, neglect the effects of capacitor selector switch 308 and capacitor 305, and consider only signals received from the split transponder at intersection $a$. During each signal cycle, capacitor 319 is connected to the heel of contact 304 for the percentage of a cycle equivalent to split input signal $$\frac{C_a}{A_a+C_a}$$

During the time in which relay 310 is energized, an amount of charge equal to $$K_{1a}E_R$$

is transferred to capacitor 301 upon each energization of relay 302. Thus, during each signal cycle, the amount of charge added to capacitor 301 due to operation of the split transponder at intersection $a$ may be written:

$$Q_A=NE_RK_{1a} \tag{9}$$

where N represents the number of times that relay 302 pulses during the interval throughout which relay 310 is energized. N may thus be represented by the term $$N=\frac{nC_a}{A_a+C_a} \tag{10}$$

Substituting for N in Equation 9, the expression for $Q_A$ may be rewritten:

$$Q_A=\frac{nC_a}{A_a+C_a}E_RK_{1a} \tag{11}$$

During the time in which relay 310 is energized, charge is subtracted from capacitor 301 by capacitor 325, which acquires the subtracted charge. This action occurs once per signal cycle since there exists no intervening contact of relay 302 between capacitor 325 and the input of amplifier 300. Thus, during each signal cycle, the amount of charge removed from capacitor 301 due to operation of the split transponder at intersection $a$ may be written:

$$Q_S=E_oK_{2a} \tag{12}$$

If the amount of charge added to capacitor 301 during each signal cycle does not equal the amount subtracted during the cycle, a change in voltage across capacitor 301 occurs. This change occurs in a direction to cause the quantities of charges added and subtracted to become more nearly equal. Thus, if the split input signal constitutes a constantly recurring waveform from the split transponder at intersection $a$ for a sufficient duration of time, the charge on capacitor 301 reaches a value at which the total amount of charge added during each signal cycle is equal to the total amount of charge subtracted during each signal cycle. From this time on, the charge on capacitor 301 remains substantially constant, and the voltage thereon, which is equal to voltage $E_o$, now represents the split input signal $$\frac{C_a}{A_a+C_a}$$

That this is so, may be verified by equating the values of $Q_A$ and $Q_S$ as expressed in Equations 11 and 12, or $$\frac{nC_a}{A_a+C_a}E_RK_{1a}=E_oK_{2a}$$

$E_o$ may then be expressed as $$E_o=\frac{C_a}{A_a+C_a}nE_R\frac{K_{1a}}{K_{2a}} \tag{13}$$

Since, $K_{1a}$, $K_{2a}$, $E_R$ and $n$ are all constants, output voltage $E_o$ of amplifier 300 represents the parameter $$\frac{C_a}{A_a+C_a}$$

Capacitor selector switch 308 provides an additional input to the computer which serves as a base value to be suitably modified by information obtained from the split transponders, while capacitor 305 provides additional feedback required when this additional input is utilized. If no information is received from any split transponder, whatever the reason, relays 310, 311 and 312 are all deenergized, and the output voltage of amplifier 300 is then determined solely by the size of capacitance provided by the capacitor selector switch.

For example.

let $K_4$=capacitance of capacitor 305, and
let $K_5$=capacitance selected by selector switch 308.

Then, for each operation of relay 302, the charge added to capacitor 301 is $$Q_A=E_R K_5$$

and the charge subtracted from capacitor 301 is $$Q_S=E_o K_4$$

For equilibrium, $$Q_A=Q_S$$

and therefore $$E_o=E_R\frac{K_5}{K_4} \tag{14}$$

Since $E_R$ and $K_4$ are constants, $E_o$ is thus directly proportional to the size of capacitance selected by selector switch 308.

Assume now that $K_5$ is the base value of capacitance selected by switch 308, so that any other capacitor selected by the switch may be represented as $wK_5$. Output voltage of amplifier 300, when all split transponders are operating, represents an average output for all input signals, and may be written $$E_o=\frac{nE_R}{3+w}\left(\frac{K_{1a}}{K_{2a}}\frac{C_a}{A_a+C_a}+\frac{K_{1b}}{K_{2b}}\frac{C_b}{A_b+C_b}+\frac{K_{1c}}{K_{2c}}\frac{C_c}{A_c+C_c}+\frac{wK_5}{K_4}\right) \tag{15}$$

Since the capacitors are all constant, and letting $$K_{1a}=K_{1b}=K_{1c}$$

letting $$K_{2a}=K_{2b}=K_{2c}$$

and letting $$Y=\frac{K_{2a}}{K_{1a}}\frac{K_5}{K_4}$$

then $$E_o=\frac{1}{3+w}\left(\frac{C_a}{A_a+C_a}+\frac{C_b}{A_b+C_b}+\frac{C_c}{A_c+C_c}+wY\right)$$

From the foregoing, it can be seen that capacitor selector switch 308 may exercise a variable influence over the final determination of split voltage by computer 18, depending upon the value of weighing factor *w*.

When split input signals are supplied to each of relays 310, 311 and 312, output voltage of operational amplifier 300 is determined by the average of the split inputs supplied by the split transponders at each of intersections *a*, *b* and *c*, and the input determined by the position of selector switch 308. Each of these four input voltages is weighed equally in the final split determination. If one of the split transponders should fail, or if it is simply removed from the circuit, the effect of this transponder in the split computation is cancelled, since the capacitors coupled to the heel of the inactive relay acquire a steady state charge. Thus, the split computation remains logical, being based upon the remaining split input signals and the position of capacitance selector 308. Moreover, if all three split transponders should be deactivated, the computed split voltage is still logically computed, being based solely upon the position of capacitance selector switch 308. The circuit may, of course, be expanded to include any number of split transponders as already mentioned.

In the circuit shown in FIG. 14, the computed split voltage is divided into one of three levels. This is achieved by proper positioning of the taps of potentiometers 346, 347, 348 and 349, thereby selecting the second input voltages to each of analog comparators 340 and 341. For example, the tap setting of potentiometer 347 determines the minimum amplitude of amplifier 300 output voltage which is necessary in order to energize relay 342. Similarly, the tap setting on potentiometer 346 determines the minimum amplitude of amplifier 300 output voltage necessary to maintain relay 342 in its energized condition. The taps of potentiometers 348 and 349 are used similarly to control the drop-away and pick-up voltages respectively for relay 344, as supplied by operational amplifier 300. The tap settings on potentiometers 346 and 347 are different from the tap settings on potentiometers 348 and 349, in order that relay 342 be energized and deenergized at lower amplitudes of amplifier 300 output voltages than relay 344. Hence, relay 344 can be energized only when relay 342 is energized. The manner by which contacts 352 and 353 of relays 342 and 344, respectively, divide the voltage supplied from amplifier 300 into one of three levels has already been described. By use of additional analog comparators and output relays, the output voltage of amplifier 300 could be classified into more than three levels. In addition, the analog split term as provided by amplifier 300 may also be used directly for continuous control of split, in circuits requiring such voltage.

There has been shown a traffic signal split control system for controlling traffic signal split at intersections along an artery. The system calculates split for traffic signals at intersections dispersed along the artery on the basis of traffic conditions as sampled at preselected intersections. Moreover, the system is non-responsive to signals provided from split transponders which have failed at any of the sampled intersections. The system is rugged, consumes modest amounts of power, and is extremely versatile.

Although but several embodiments of the present invention have been described, it is to be specifically understood that these forms are selected to facilitate in disclosure of the invention rather than to limit the number of forms which it may assume; various modifications and adaptations may be applied to the specific forms shown to meet requirements of practice, without in any manner departing from the spirit or scope of the invention.

What is claimed is:

1. In a traffic control system, means for controlling the cycle split of traffic signals at an intersection comprising, vehicle detector means responsive to vehicles approaching said intersection, first means responsive to said vehicle detector means for generating a manifestation representative of the relative amounts of vehicular traffic on respectively different conflicting approaches to said intersection, second means responsive to the length of the signal cycle of said traffic signals at any given time, and third means controlled both by said first and second means for generating a cycle split signal for controlling the change of display of signal indications by said traffic signals from a first combination of indications to a second combination.

2. The traffic control system of claim 1 which further includes means for generating repetitive pulses in successive groups each comprising a predetermined number of such pulses occurring at a controllable rate in accordance with a desired signal cycle duration and with successive of said groups being demarcated by a distinctive synchronizing signal, said third means being responsive to said pulses and generating a signal varying in amplitude substantially linearly between successive of said synchronizing signals, said third means further generating a distinctive split signal once each signal cycle when said varying signal reaches a predetermined amplitude relative to the then existing value of said manifestation for controlling said change of display of traffic signal indications.

3. The system of claim 2 in which said signal generated by said third means increases in amplitude by a predetermined increment in response to each received pulse, said third means abruptly restoring said varying signal to a predetermined low amplitude in response to each said synchronizing signal, said third means producing said distinctive split signal each time the amplitude of said varying signal equals the amplitude of said manifestation.

4. Apparatus for measuring a parameter representing traffic flow only in the more heavily travelled direction of a highway comprising at least one vehicle detector for each direction of traffic, signal storage means, first means for adding an increment of signal to said storage means in response to each detection of a vehicle by said vehicle detector for one direction of traffic and for subtracting a decrement of signal from said storage means in response to each detection of a vehicle by said vehicle detector for the opposite direction of traffic, traffic parameter measuring means responsive to the actuations of a vehicle detector for computing a predetermined parameter representative of traffic congestion of the traffic sensed by a selected one of said vehicle detectors, and second means responsive to the value of the signal stored in said signal storage means for applying signals representative of detector actuations only from selected detectors responsive only to traffic moving in a particular direction to said traffic parameter measuring means.

5. The apparatus of claim 4 in which said signal storage means comprises a capacitor, said first means connects said capacitor to a positive source of voltage for each detection of a vehicle by said detector for said one direction of traffic and connects said capacitor to a negative source of voltage for each detection of a vehicle by said detector for said opposite direction of traffic, said second means including means having two outputs which are selectively energized in response to the polarity of voltage across said capacitor, a first AND gating means receiving a first input from said detector for said one direction of traffic and a second input from one of said outputs and also including a second AND gating means receiving a first input from said detector for said opposite direction of traffic and a second input from the other of said outputs, whereby only one of said AND gating means at any time supplies an output to said traffic parameter measuring means.

6. Means for controlling cycle split for a traffic signal situated at an intersection of at least two streets comprising, first vehicle detector means responsive to traffic on the first of said streets and second vehicle detector means responsive to traffic on the second of said streets, means controlled by both said first and second vehicle detector means for generating a first signal characteristic of the difference in the amounts of traffic on said first and second streets respectively, means generating a second signal characteristic of the duration of a signal cycle of said traffic signal, and means controlled by both said first and second signals for generating a third signal characteristic of a desired ratio of the proceed signal indications disdisplayed to traffic on said first and second streets respectively.

7. Means for determining optimum cycle split for an intersection of at least a pair of roadways comprising first and second vehicle detecting means monitoring traffic flow in both directions along one of the roadways, third and fourth vehicle detecting means monitoring traffic flow in both directions along the other roadway, operational amplifier means having an input and an output, capacitance means connected between the input and output of the operational amplifier means, first and second resistor means coupled to the input of the operational amplifier means, first and second switching means respectively coupling the first and second resistor means to the output of the operational amplifier means, first detector selection means coupling output voltages from the vehicle detecting means sensing traffic on the first roadway in the direction of heaviest traffic flow to both the input of the operational amplifier means and a control input of the first switching means, and second detector selection means coupling output voltages provided by the vehicle detecting means sensing traffic on the second roadway in the direction of heaviest traffic flow to a control input of the second switching means whereby said first and second switching means respectively are closed during the presence of output voltage produced by the first and second detector selection means.

8. The optimum split determining means of claim 7 including averaging means responsive to output voltage provided by the operational amplifier means for averaging variations in output voltage amplitude produced by the operational amplifier means over a finite time interval.

9. Means for determining optimum cycle split for an intersection of a trio of roadways comprising first and second vehicle detecting means monitoring traffic flow in both directions along a first one of the roadways; third and fourth vehicle detecting means monitoring traffic flow in both directions along a second one of the roadways; fifth and sixth vehicle detecting means monitoring traffic flow in both directions along the third one of the roadways; operational amplifier means having an input and an output; capacitance means connected between the input and output of the operational amplifier means; first, second and third resistor means coupled to the input of the operational amplifier means; first, second and third switching means respectively coupling the first, second and third resistor means to the output of the operational amplifier means; first detector selection means coupling output voltages from the vehicle detecting means sensing traffic on the first roadway in the direction of heaviest traffic flow to both the input of the operational amplifier means and a control input of the first switching means; and second and third detector selection means respectively coupling output voltages from the vehicle detecting means sensing traffic on the second and third roadway in the directions of heaviest traffic flow to the control inputs of the second and third switching means respectively whereby said first, second and third switching means are closed during the presence of output voltage produced by the first, second and third detector selection means respectively.

References Cited by the Examiner

UNITED STATES PATENTS 3,072,883 1/1963 Hendricks et al. ------ 340—35
3,120,651 2/1964 Hendricks ------------ 340—35

FOREIGN PATENTS 992,198 7/1951 France.

NEIL C. READ, *Primary Examiner.*

THOMAS B. HABECKER, *Examiner.*